US010733041B2

(12) United States Patent
Parthasarathy et al.

(10) Patent No.: US 10,733,041 B2
(45) Date of Patent: Aug. 4, 2020

(54) SYSTEM, METHOD AND COMPUTER PROGRAM PRODUCT FOR PROVIDING STATUS INFORMATION DURING EXECUTION OF A PROCESS TO MANAGE RESOURCE STATE ENFORCEMENT

(71) Applicant: Nutanix, Inc., San Jose, CA (US)

(72) Inventors: Ranjan Parthasarathy, Milpitas, CA (US); Akshay Anant Deodhar, Cupertino, CA (US); Binny Sher Gill, San Jose, CA (US); Carl David Sutton, San Martin, CA (US)

(73) Assignee: NUTANIX, INC., San Jose, CA (US)

( * ) Notice: Subject to any disclaimer, the term of this patent is extended or adjusted under 35 U.S.C. 154(b) by 5 days.

(21) Appl. No.: 15/842,698

(22) Filed: Dec. 14, 2017

(65) Prior Publication Data
US 2019/0324766 A1    Oct. 24, 2019

Related U.S. Application Data

(60) Provisional application No. 62/434,456, filed on Dec. 15, 2016.

(51) Int. Cl.
*G06F 11/07* (2006.01)
*G06F 9/50* (2006.01)
(Continued)

(52) U.S. Cl.
CPC ........ *G06F 11/0793* (2013.01); *G06F 9/5027* (2013.01); *G06F 11/0721* (2013.01);
(Continued)

(58) Field of Classification Search
None
See application file for complete search history.

(56) References Cited

U.S. PATENT DOCUMENTS

| 7,343,453 | B2 | 3/2008 | Prahlad et al. |
| 7,406,053 | B2 * | 7/2008 | Cheung ................. G06Q 40/04 370/252 |

(Continued)

OTHER PUBLICATIONS

U.S. Appl. No. 15/818,704, filed Nov. 20, 2017, 71 pages.
(Continued)

*Primary Examiner* — Abu Zar Ghaffari
(74) *Attorney, Agent, or Firm* — Foley & Lardner LLP

(57) ABSTRACT

Systems for achieving and maintaining a specified state of a computing resource in a distributed computing environment. A method embodiment commences upon receiving one or more specification parameters that describe a desired target state associated with a particular computing resource and/or of a particular computing environment. The specification parameters that characterize the desired target state of a resource are recorded in a target state data structure. Periodically, an agent issues a state progression query to determine if the computing resource has reached its desired target state. The query is then processed by collecting state parameters that describe the then-current state of the computing resource or environment. The target state data structure is accessed to identify one or more state differences between the desired target state and the then-current state of the particular computing resource and/or its particular computing environment. Remediation operations based on the state differences are then carried out.

25 Claims, 12 Drawing Sheets

(51) Int. Cl.
  *G06F 16/242* (2019.01)
  *G06F 9/455* (2018.01)
  *H04L 12/24* (2006.01)
  *H04L 29/08* (2006.01)

(52) U.S. Cl.
  CPC ........ *G06F 16/242* (2019.01); *H04L 41/0896* (2013.01); *H04L 41/5009* (2013.01); *G06F 9/45558* (2013.01); *G06F 9/5005* (2013.01); *G06F 9/505* (2013.01); *G06F 9/5011* (2013.01); *H04L 67/10* (2013.01)

(56) References Cited

U.S. PATENT DOCUMENTS

| | | | | |
|---|---|---|---|---|
| 7,433,951 B1* | 10/2008 | Waldspurger | ......... | G06F 9/5016 709/226 |
| 7,783,666 B1 | 8/2010 | Zhuge et al. | | |
| 7,861,247 B1* | 12/2010 | Santos | ................ | G06Q 10/06 718/104 |
| 8,209,687 B2* | 6/2012 | Yuyitung | ............... | G06Q 10/06 718/1 |
| 8,234,650 B1* | 7/2012 | Eppstein | ............... | G06F 9/5072 709/220 |
| 8,260,897 B2* | 9/2012 | Graser | ................... | G06Q 10/10 709/223 |
| 8,296,419 B1* | 10/2012 | Khanna | ................ | G06F 9/5072 709/201 |
| 8,443,370 B2* | 5/2013 | Smith | ...................... | G06F 9/50 718/104 |
| 8,549,518 B1 | 10/2013 | Aron et al. | | |
| 8,600,947 B1 | 12/2013 | Freiheit et al. | | |
| 8,601,473 B1 | 12/2013 | Aron et al. | | |
| 8,850,130 B1 | 9/2014 | Aron et al. | | |
| 8,997,097 B1 | 3/2015 | Aron et al. | | |
| 9,052,936 B1 | 6/2015 | Aron et al. | | |
| 9,256,374 B1 | 2/2016 | Aron et al. | | |
| 9,256,475 B1 | 2/2016 | Aron et al. | | |
| 9,354,912 B1 | 5/2016 | Aron et al. | | |
| 9,389,887 B1 | 7/2016 | Aron et al. | | |
| 9,397,886 B2* | 7/2016 | Yasuda | ............... | H04L 41/0813 |
| 9,473,799 B1* | 10/2016 | Mentz | ................... | H04L 9/3213 |
| 9,495,142 B2* | 11/2016 | Koushik | ................... | G06F 8/61 |
| 9,542,225 B2* | 1/2017 | Yamashima | .......... | G06F 9/5077 |
| 9,558,459 B2* | 1/2017 | Bobak | ..................... | G06Q 10/06 |
| 9,575,784 B1 | 2/2017 | Aron et al. | | |
| 9,612,815 B1* | 4/2017 | Jagtap | ....................... | G06F 8/61 |
| 9,619,257 B1 | 4/2017 | Aron et al. | | |
| 9,654,511 B1 | 5/2017 | Brocco et al. | | |
| 9,754,303 B1* | 9/2017 | Jagtap | ................. | G06Q 30/0631 |
| 9,772,866 B1 | 9/2017 | Aron et al. | | |
| 10,026,070 B2* | 7/2018 | Thorpe | ................ | G06Q 20/145 |
| 10,104,170 B2* | 10/2018 | Sebbah | ............... | H04L 67/1023 |
| 10,346,775 B1* | 7/2019 | Xu | .......................... | H04L 41/00 |
| 10,430,293 B1 | 10/2019 | Skowronski et al. | | |
| 2004/0103173 A1* | 5/2004 | Donatelli | ................... | G06F 8/60 709/221 |
| 2004/0122830 A1 | 6/2004 | Schwartz et al. | | |
| 2006/0225065 A1 | 10/2006 | Chandhok et al. | | |
| 2007/0220039 A1 | 9/2007 | Waldman et al. | | |
| 2008/0134178 A1* | 6/2008 | Fitzgerald | ........... | G06F 9/45537 718/1 |
| 2008/0134193 A1* | 6/2008 | Corley | ...................... | G06F 9/52 718/104 |
| 2009/0182915 A1* | 7/2009 | Farrell | ................ | G06F 9/44505 710/104 |
| 2009/0183168 A1* | 7/2009 | Uchida | ................ | G06F 9/5077 718/104 |
| 2010/0145929 A1* | 6/2010 | Burger | .............. | G06F 16/24545 707/713 |
| 2011/0096687 A1* | 4/2011 | Dottling | ................ | H04W 24/02 370/252 |
| 2011/0276951 A1* | 11/2011 | Jain | ..................... | G06F 11/3006 717/140 |
| 2012/0166977 A1 | 6/2012 | Demant et al. | | |
| 2012/0203911 A1 | 8/2012 | London et al. | | |
| 2012/0254719 A1 | 10/2012 | Hackmann et al. | | |
| 2012/0291042 A1* | 11/2012 | Stubbs | .................. | G06F 1/3203 718/104 |
| 2013/0007753 A1* | 1/2013 | Jain | ........................... | G06F 9/46 718/103 |
| 2013/0103835 A1* | 4/2013 | Yotsutani | .............. | H04L 69/329 709/225 |
| 2014/0046638 A1* | 2/2014 | Peloski | ............... | G06F 17/5009 703/6 |
| 2014/0108034 A1* | 4/2014 | Akbay | .................... | G06Q 50/22 705/2 |
| 2014/0244842 A1* | 8/2014 | Rosensweig | .......... | G06F 9/5072 709/226 |
| 2014/0282518 A1* | 9/2014 | Banerjee | ............. | G06F 9/45533 718/1 |
| 2014/0282586 A1* | 9/2014 | Shear | ..................... | G06F 9/5072 718/104 |
| 2015/0121520 A1* | 4/2015 | Tsien | ...................... | G06F 21/81 726/22 |
| 2015/0135185 A1* | 5/2015 | Sirota | ................... | G06F 9/5061 718/103 |
| 2015/0220553 A1* | 8/2015 | Poon | ................... | G06F 16/2452 707/722 |
| 2016/0055026 A1* | 2/2016 | Fitzgerald | ............... | G06F 21/51 718/1 |
| 2016/0179416 A1 | 6/2016 | Mutha et al. | | |
| 2016/0188594 A1* | 6/2016 | Ranganathan | .... | G06F 16/24552 707/769 |
| 2017/0168907 A1* | 6/2017 | Harper | ..................... | G06F 11/14 |
| 2018/0007060 A1 | 1/2018 | Leblang et al. | | |
| 2018/0018082 A1 | 1/2018 | Sarbin et al. | | |
| 2018/0063017 A1* | 3/2018 | Beveridge | ........... | G06F 16/2471 |

OTHER PUBLICATIONS

"What are protocol buffers?". Google Developers. Sep. 5, 2017. 2 pages.

Wikipedia. "Anonymous function". Sep. 16, 2017. 38 pages.

Poitras, Steven. "The Nutanix Bible" (Oct. 15, 2013), from stevenpoitras.com/the-nutanix-bible/ (Publication date based on indicated capture date by Archive.org; first publication date unknown).

Poitras, Steven. "The Nutanix Bible" (Jan. 11, 2014), from stevenpoitras.com/the-nutanix-bible/ (Publication date based on indicated capture date by Archive.org; first publication date unknown).

Poitras, Steven. "The Nutanix Bible" (Jun. 20, 2014), from stevenpoitras.com/the-nutanix-bible/ (Publication date based indicated on capture date by Archive.org; first publication date unknown).

Poitras, Steven. "The Nutanix Bible" (Jan. 7, 2015), from stevenpoitras.com/the-nutanix-bible/ (Publication date based on indicated capture date by Archive.org; first publication date unknown).

Poitras, Steven. "The Nutanix Bible" (Jun. 9, 2015), from stevenpoitras.com/the-nutanix-bible/ (Publication date based on indicated capture date by Archive.org; first publication date unknown).

Poitras, Steven. "The Nutanix Bible" (Sep. 4, 2015), from nutanixbible.com/.

Poitras, Steven. "The Nutanix Bible" (Jan. 12, 2016), from nutanixbible.com/.

Poitras, Steven. "The Nutanix Bible" (Jun. 9, 2016), from //nutanixbible.com/.

Poitras, Steven. "The Nutanix Bible" (Jan. 3, 2017), from //nutanixbible.com/.

Poitras, Steven. "The Nutanix Bible" (Jun. 8, 2017), from nutanixbible.com/.

Poitras, Steven. "The Nutanix Bible" (Jan. 3, 2018), from nutanixbible.com/.

Poitras, Steven. "The Nutanix Bible" (Jun. 25, 2018), from nutanixbible.com/.

Poitras, Steven. "The Nutanix Bible" (Jan. 8, 2019), from nutanixbible.com/.

Non-Final Office Action dated Apr. 26, 2019 for U.S. Appl. No. 15/842,869, 17 pages.

(56) References Cited

OTHER PUBLICATIONS

"What Are Protocol Buffers?"—Google Developers—Sep. 5, 2017—2 pgs.
Cano, Ignacio, et al. "Curator: Self-Managing Storage for Enterprise Clusters" (Mar. 27, 2017), from ww.usenix.org/conference/nsdi17/.
Wikipedia—"Anonymous Function."—Sep. 16, 2017—38 pgs.
Notice of Allowance dated Sep. 23, 2019 for U.S. Appl. No. 15/842,436.
Final Office Action dated Sep. 25, 2019 for U.S. Appl. No. 15/842,869.
Non-Final Office Action dated Oct. 3, 2019 for U.S. Appl. No. 15/842,837.

* cited by examiner

SYSTEM, METHOD AND COMPUTER PROGRAM PRODUCT FOR PROVIDING STATUS INFORMATION DURING EXECUTION OF A PROCESS TO MANAGE RESOURCE STATE ENFORCEMENT

RELATED APPLICATIONS

The present application claims the benefit of priority to U.S. Patent Application Ser. No. 62/434,456 titled "INTENT FRAMEWORK", filed on Dec. 15, 2016, which is hereby incorporated by reference in its entirety; and the present application is related to co-pending U.S. Patent Application Ser. No. 15/842,436 titled "SPECIFICATION-BASED COMPUTING SYSTEM CONFIGURATION" filed on even date herewith, which is hereby incorporated by reference in its entirety; and the present application is related to co-pending U.S. Patent Application Ser. No. 15/842,869 titled "USER INTERFACE VIEW GENERATION", filed on even date herewith, which is hereby incorporated by reference in its entirety; and the present application is related to co-pending U.S. Patent Application Ser. No. 15/842,837 titled "RULE-BASED DATA PROTECTION", filed on even date herewith, which is hereby incorporated by reference in its entirety; and the present application is related to co-pending U.S. Patent Application Ser. No. 15/842,714 titled "ACCESSING COMPUTING RESOURCE ATTRIBUTES OF AN EXTERNAL SERVICE PROVIDER", filed on even date herewith, which is hereby incorporated by reference in its entirety.

FIELD

This disclosure relates to distributed computing, and more particularly to techniques for resource state enforcement.

BACKGROUND

Many modern computing systems are designed to offer tremendous flexibility to the users of the computing systems. This flexibility allows users to scale, configure, or otherwise adjust the computing system to fit the requirements of each individual user. Computing system vendors facilitate such flexibility using various configuration techniques. For example, computing system vendors can provide libraries of application programming interfaces (APIs) that users can use to perform various configuration operations at the computing system. The configuration operations are used to accomplish some purpose and/or to achieve some target state pertaining to the computing resources of the computing system. In highly active computing systems, with a changing mix of users and resources, configuration operations can be issued at a high rate from numerous sources (e.g., administrators, computing processes, etc.).

Unfortunately, configuration operations that are performed in highly active computing systems can sometimes fail to achieve their expected target resource configuration states (e.g., fail to achieve an expected "Success" status). In some cases, failure to achieve an expected state can arise due to system problems. In other cases, failure to achieve an expected state can arise due to multiple sets of instructions being processed over the same resource. For example, two different sets of configuration operations invoked by two different system administrators may specify two different target resource states for the same resource, and those two different target resource states might be in conflict. More specifically, one administrator might specify a memory size of 2 GB for a virtual machine (VM) while, at some slightly later time, the same or other administrator might specify a memory size of 1 GB for the same virtual machine. In this case, there is a conflict between the initially-specified "memory size of 2 GB" and the later-specified "memory size of 1 GB". As such, unless the conflict is recognized and remediated, the "true" intended state may not be achieved. In other situations, a resource state that was earlier achieved may no longer be "true" due to, for example, a manual override by a user. In still other cases, configuration operations corresponding to a certain intended state issued under a first set of system conditions may not achieve the intended state due to any of a variety of then-current system problems.

What is needed is a technique to achieve and maintain specified resource states in the face of rapidly changing characteristics of the underlying computing system and/or its environment.

SUMMARY

The present disclosure describes techniques used in systems, methods, and in computer program products for resource state enforcement, which techniques advance the relevant technologies to address technological issues with legacy approaches. More specifically, the present disclosure describes techniques used in systems, methods, and in computer program products for enforcing specified resource states in computing systems. Certain embodiments are directed to technological solutions for continually comparing the then-current states of computing resources to corresponding target states of the same computing resources to determine the need and nature of any remedial actions to take so as to eventually achieve the specified target states.

The disclosed embodiments modify and improve over legacy approaches. In particular, the herein-disclosed techniques provide technical solutions that address the technical problems attendant to achieving and maintaining specified resource states in rapidly changing computing systems. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Specifically, for purposes of efficiency, a first certain subset of acts pertaining to formulating and issuing a response to the state progression query are initiated synchronously with respect to the time of receipt of the query, while a different subset of acts pertaining to formulating and issuing a response to the state progression query are initiated asynchronously with respect to the time of receipt of the query. As such, early detection of problems can be accomplished, thus avoiding expenditure of computing resources that would otherwise be wasted when using legacy techniques.

Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of hyperconverged computing platform management as well as advances in various technical fields related to distributed storage systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
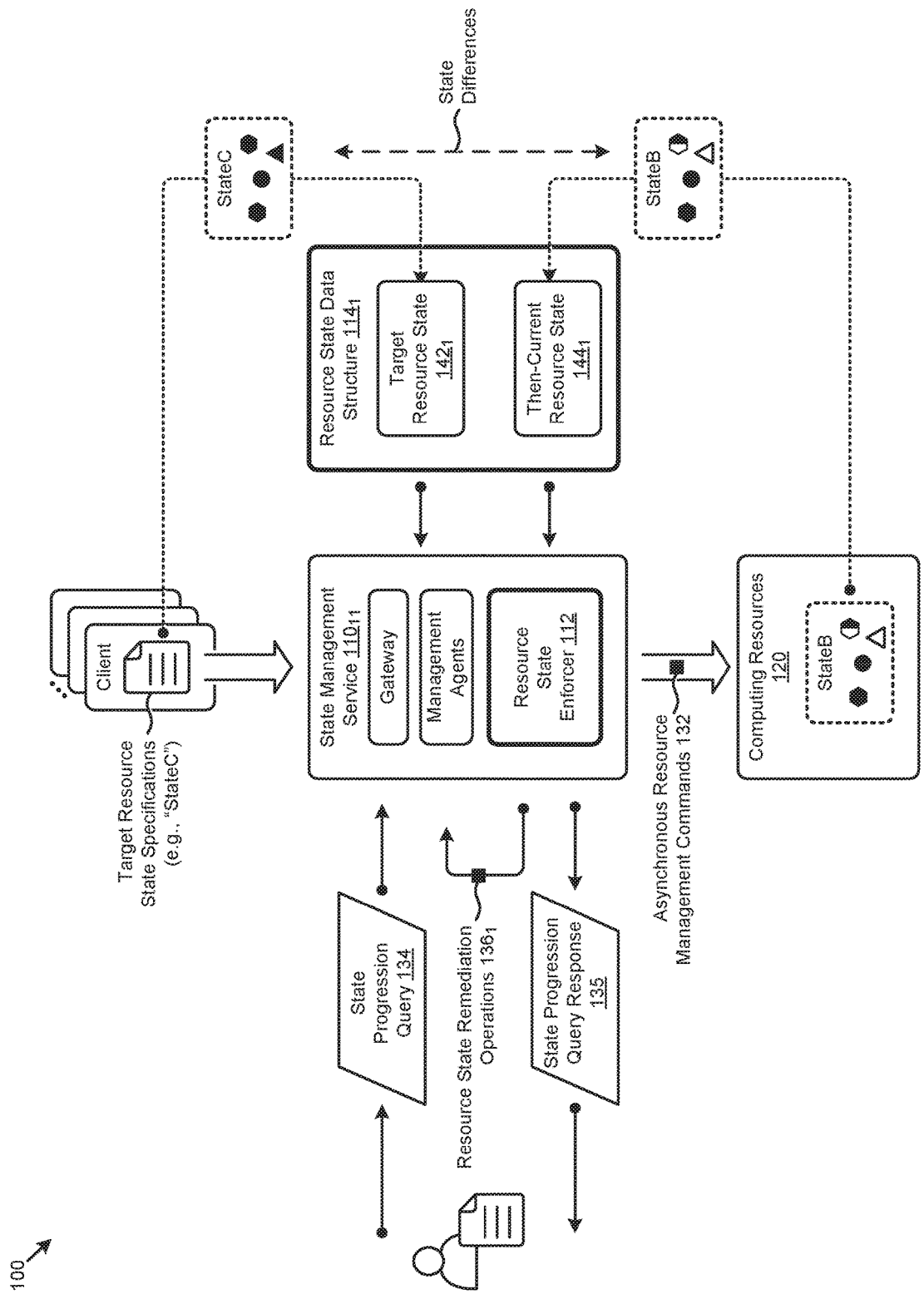
FIG. 1 illustrates a computing environment in which embodiments of the present disclosure can be implemented.

Embodiments in accordance with the present disclosure address the problem of achieving and maintaining specified resource states in rapidly changing computing systems. Some embodiments are directed to approaches for continually comparing then-current states of computing resources to corresponding target states of the computing resources to determine the need for, and nature of, actions to take so as to achieve the specified target states. The accompanying figures and discussions herein present example environments, systems, methods, and computer program products for enforcing specified resource states in computing systems.

OVERVIEW

Disclosed herein are techniques that continually compare measured states of computing resources to corresponding target states of the computing resources to determine next actions to take to achieve the specified target state. In certain embodiments, a specialized data structure is implemented to store specifications of target states (e.g., desired states) of resource entities as well as the then-current states (e.g., actual states) of those resource entities (e.g., VMs). When a set of specifications describing a target state for one or more resource entities are issued (e.g., from a user, a process, etc.), the specifications are stored in the aforementioned specialized data structure. A set of resource management commands corresponding to the issued specifications are invoked to access the data structure, and to configure/reconfigure the computing resources and/or aspects of the underlying computing infrastructure so as to eventually achieve the desire target state.

Parameters describing a then-current state of the resource entities are collected and stored in the specialized data structure. A set of parameters describing the target state and a set of parameters describing the then-current state are accessed from the specialized data structure and compared to determine the nature of resource state remediation operations, if any, that are to be performed so as to achieve the target state at the computing system. In certain embodiments, the resource state remediation operations are based at least in part on the specific state differences between the set of target state parameters and the set of then-current state parameters. In certain embodiments, the resource state remediation operations are based at least in part on the then-current computing system conditions. In certain embodiments, the resource state remediation operations are based at least in part on one or more state management rules.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

In computing environments such as computing environment 100, one or more clients (e.g., users, computing processes, etc.) might want to configure certain computing resources in the computing system to accomplish some purpose. For example, a user or client process might desire to establish a certain computing resource state (e.g., configuration) of a particular resource (e.g., a virtual machine or a virtual disk) to carry out a particular set of tasks or to perform in a particular storage or networking capacity, etc. A specified resource state might correspond to a particular type of resource entity that is configured to have attributes (e.g., specifications) that are particular to the task (e.g., a binary image to run on a particular CPU). Another specified resource state might correspond to a particular desired storage capability (e.g., an initial storage space allocation). Still another specified resource state might correspond to a networking capability (e.g., establishment of a network interface), etc.

To pursue achievement of a particular state, a state management service accepts target state specifications and determines steps to perform in order to achieve the specified state. A resource state enforcer monitors progression toward the desired target state. At any moment in time, a user or agent can query the state management service to determine the then-current status of the progression to the desired state, and/or if there are problems or conflicts to be remediated. The user or a process can initiate remediation through commands that address the problems and/or conflicts. In some cases, the aforementioned remediation can be accomplished in a very short period of time, such as a few hundred milliseconds. In other cases, the aforementioned remediation might not be able to be accomplished in a very short period of time, and/or might demand user intervention. As such, a user can issue a state progression query to the state management service, receive a state progression query response, and then perform remediation based on the contents of the state progression query response.

The ability for a user or process to know of the status of the then-current progression of a pursuit to a desired target state is especially important in the context of computing systems that implement specification-based computing system configuration. Specifically, in the context of specification-based computing system configuration, although by simply specifying a desired target state, the user is relieved of the responsibility of devising and coding procedures to pursue and achieve the desired state, it is a consequence of this simplification that the user would not know the details of how the desired target state is being pursued and thus, needs a generalized query/response mechanism to determine if a particular target resource state has or has not been achieved, and if not, why not. A detailed description of how to use such a generalized query/response mechanisms is discussed as pertains to FIG. 5A and FIG. 5B.

Strictly as an illustrative scenario, in rapidly changing computing systems, the target resource states desired by the users or client processes might not be achieved. For example, two different sets of configuration operations invoked by two different system administrators may specify different respective target resource states that are in conflict. Specifically, one administrator might specify a memory size of 2 GB for a virtual machine (VM) while the other administrator might specify a memory size of 1 GB for the same VM. In this case, the true intended state may be ambiguous and/or the true intended state may not be achieved. Moreover, a target resource state that was earlier achieved for a user or client process may no longer be in compliance to a then-current specified target resource state due to, for example, a later-introduced manual override by another user or client process. In other cases, configuration operations corresponding to a certain target state issued under a first set of computing system conditions may not achieve the target state under the then-current computing system conditions at the time of execution of the operations.

The herein disclosed techniques address the foregoing problems attendant to achieving and maintaining (e.g., enforcing) specified resource states in rapidly changing computing systems by comparing the then-current states of computing resources to the corresponding target states of the computing resources to determine actions to take so as to achieve the target states. Specifically, as illustrated in FIG. 1, a client process can issue a set of target resource state specifications (e.g., specifications for "StateC") that describe a desired target resource state for a set of computing resources 120 (e.g., resource entities) in computing environment 100. A state management service $110_{11}$ might receive the target state specifications and invoke a set of asynchronous resource management commands 132 that are formulated to achieve the target resource state at computing resources 120. To facilitate the herein disclosed techniques, a resource state enforcer 112 at state management service $110_{11}$ stores certain specification parameters associated with the target state specifications in a resource state data structure $114_1$. The specification parameters represent a target resource state $142_1$ in resource state data structure $114_1$.

When a state progression query 134 is detected by the system and/or received at resource state enforcer 112, certain state parameters that characterize a then-current resource state $144_1$ (e.g., "StateB") are collected and stored in resource state data structure $114_1$. The target resource state $142_1$ and the then-current resource state $144_1$ from resource state data structure $114_1$ are compared at resource state enforcer 112 to determine one or more resource state remediation operations, if any, that are to be performed to achieve the target state (e.g., "StateC") at the computing resources 120.

As can be observed, resource state remediation operations $136_1$ might be issued by resource state enforcer 112 to another component of state management service $110_{11}$ to execute over computing resources 120. The resource state enforcer 112 can continually compare the then-current states of computing resources 120 to the corresponding target states of computing resources 120 to "enforce" attainment of the target states. In some cases, resource state enforcer 112 compares the then-current state parameters of a particular computing resource to the corresponding target state parameters of the same particular computing resources in response to an asynchronous change event that had caused—or could at least potentially cause—a modification of either the then-current state parameters or of the corresponding target state parameters.

A response to the aforementioned state progression query 134 is returned to the requestor. In some cases, the state progression query 134 specifies a "simple query" in accordance with which a state progression query response 135 comprises merely the determined state or states. In cases of a "compound query", not only the determined state or states are returned, but also an indication of any resource state remediation operations that had been issued.

One embodiment of a technique for such enforcement of resource states is disclosed in further detail as follows.

Figure 2:
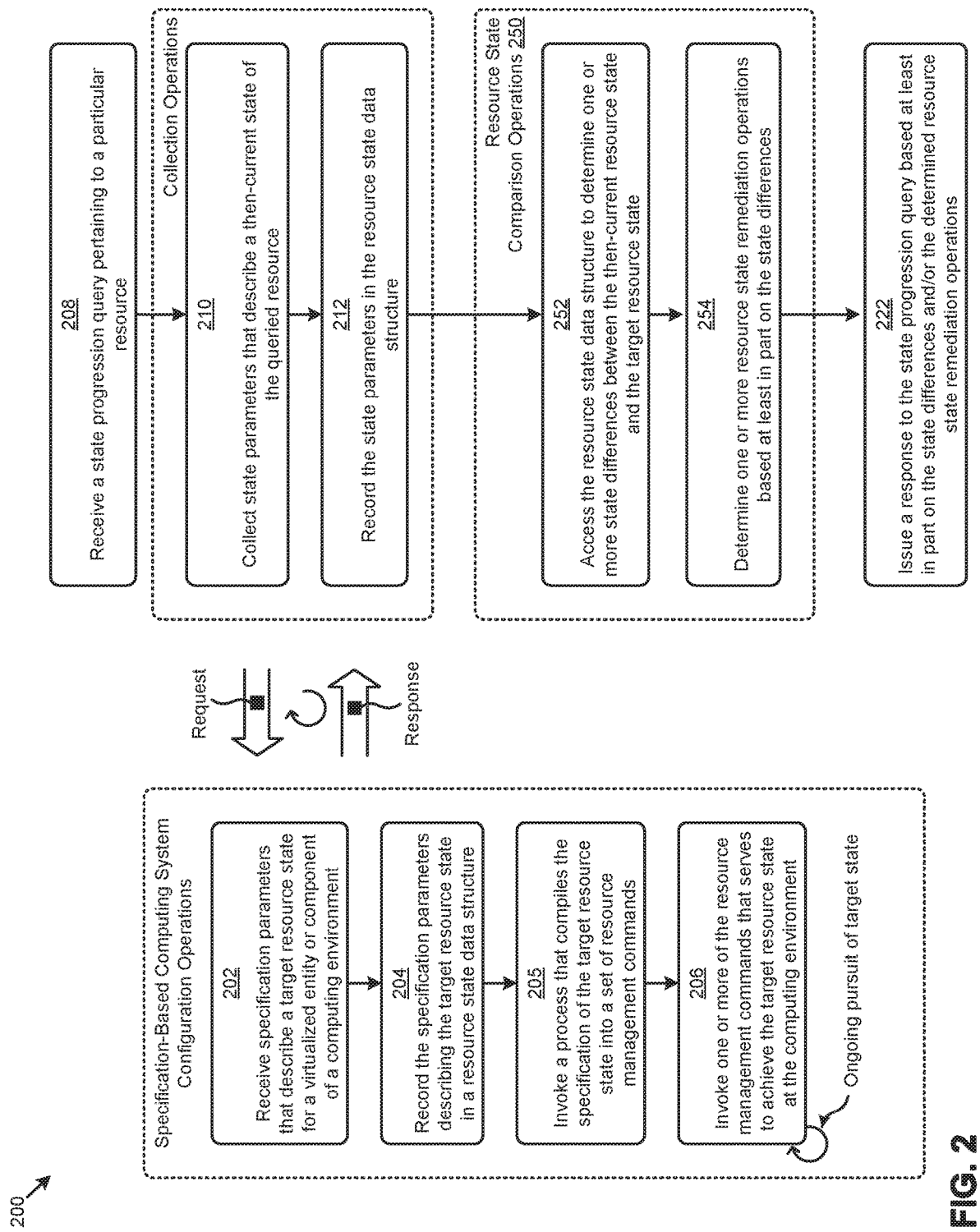
FIG. 2 depicts a resource state enforcement technique as implemented in systems that facilitate enforcing specified resource states in computing systems, according to an embodiment.

FIG. 2 depicts a resource state enforcement technique 200 as implemented in systems that facilitate enforcing specified resource states in computing systems. As an option, one or more variations of resource state enforcement technique 200 or any aspect thereof may be implemented in the context of the architecture and functionality of the embodiments described herein. The resource state enforcement technique 200 or any aspect thereof may be implemented in any environment.

The resource state enforcement technique 200 presents one embodiment of certain steps and/or operations that facilitate enforcing specified resource states in computing systems. As shown, a portion of the steps and/or operations comprise a set of resource state comparison operations 250 that are discussed in further detail as pertains to FIG. 5A.

The resource state enforcement technique 200 can commence by receiving a set of specification parameters that describe a target resource state for a virtualized entity or other constituent component of a computing environment (step 202). The specification parameters representing the target resource state are recorded in a resource state data structure (step 204).

Step 205 invokes a process that compiles the specified target resource state into a set of resource management commands. The resource management commands serve to carry out a sequence of operations that are intended to eventually achieve the specified target resource state. In pursuit of the target state, one or more of these resource management commands are invoked (step 206), and some resource management commands invoke other resource management commands. The resource management commands may be specific to a particular virtualized entity or may be specific to a particular constituent component of the computing environment. In some cases, the resource management commands may be specific to a particular condition of the computing system and/or to a particular condition of the particular virtualized entity or the resource management commands may be specific to a particular condition of one or more constituent components of the computing environment. The aforementioned pursuit of the target state may take some time. In some cases, the pursuit takes only milliseconds, in other cases, such pursuit might take many seconds, and in some cases, due to contention, error resolution, rollback, or other conditions of the computing environment, the pursuit might take a longer time. For some duration after the resource management commands are invoked (step 206) the target state might not have been reached for the aforementioned reasons.

During this timeframe collection and comparison operations can continue, and during this timeframe, the status of the state progression can be queried, as shown by the request and response interaction. Any number of request and response interactions can be carried out while the specification-based computing system configuration operations carry out ongoing pursuit of a target state.

In this embodiment, and as shown, at any point in time during pursuit of the target state, a state progression query might be issued by any computing element in the computing environment (step 208). At that point in time, even during continuing pursuit of the target state, the query can be processed, and one or more state parameters that describe a then-current resource state of the computing environment are collected (step 210). The state parameters representing the then-current resource state of the computing environment are stored in the data structure (step 212).

The issuer of the aforementioned state progression query would issue such a query in expectation of receiving query results that characterize the progress of the pursuit. More specifically, the issuer of the aforementioned state progression query would issue such a query in expectation of receiving query results that characterize differences between the then-current resource state and the target resource state. As such, resource state comparison operations 250 commence by accessing the resource state data structure to determine one or more state differences between the then-current resource state and the target resource state (step 252). In some cases, a set of permissions is accessed so as to ensure that any process or user that invokes the actions of resource state comparison operations 250 is sufficiently authenticated and/or authorized to do so. The differences determined in step 252 are codified as state differences and then stored in a database or otherwise made available for additional processing. At step 254, one or more resource state remediation operations are determined based at least in part on the state differences. A response to the state progression query is issued based at least in part on the state differences and/or the determined resource state remediation operations (step 222).

As used herein, resource state remediation operations are any computing instructions that correspond to computing tasks or commands that address a computing system problem or computing environment problem that can be at least potentially corrected without additional user intervention.

In some cases, acts pertaining to formulating and issuing a response to the state progression query are initiated synchronously in response to receipt of the query. In other cases, acts pertaining to formulating and issuing a response to the state progression query are initiated asynchronously with respect to the time of receipt of the query. In still other cases, a certain subset of acts pertaining to formulating and issuing a response to the state progression query are initiated synchronously with respect to the time of receipt of the query while a different subset of acts pertaining to formulating and issuing a response to the state progression query are initiated asynchronously with respect to the time of receipt of the query.

One embodiment of a system for implementing the resource state enforcement technique 200 and/or other herein disclosed techniques is disclosed as follows.

Figure 3:
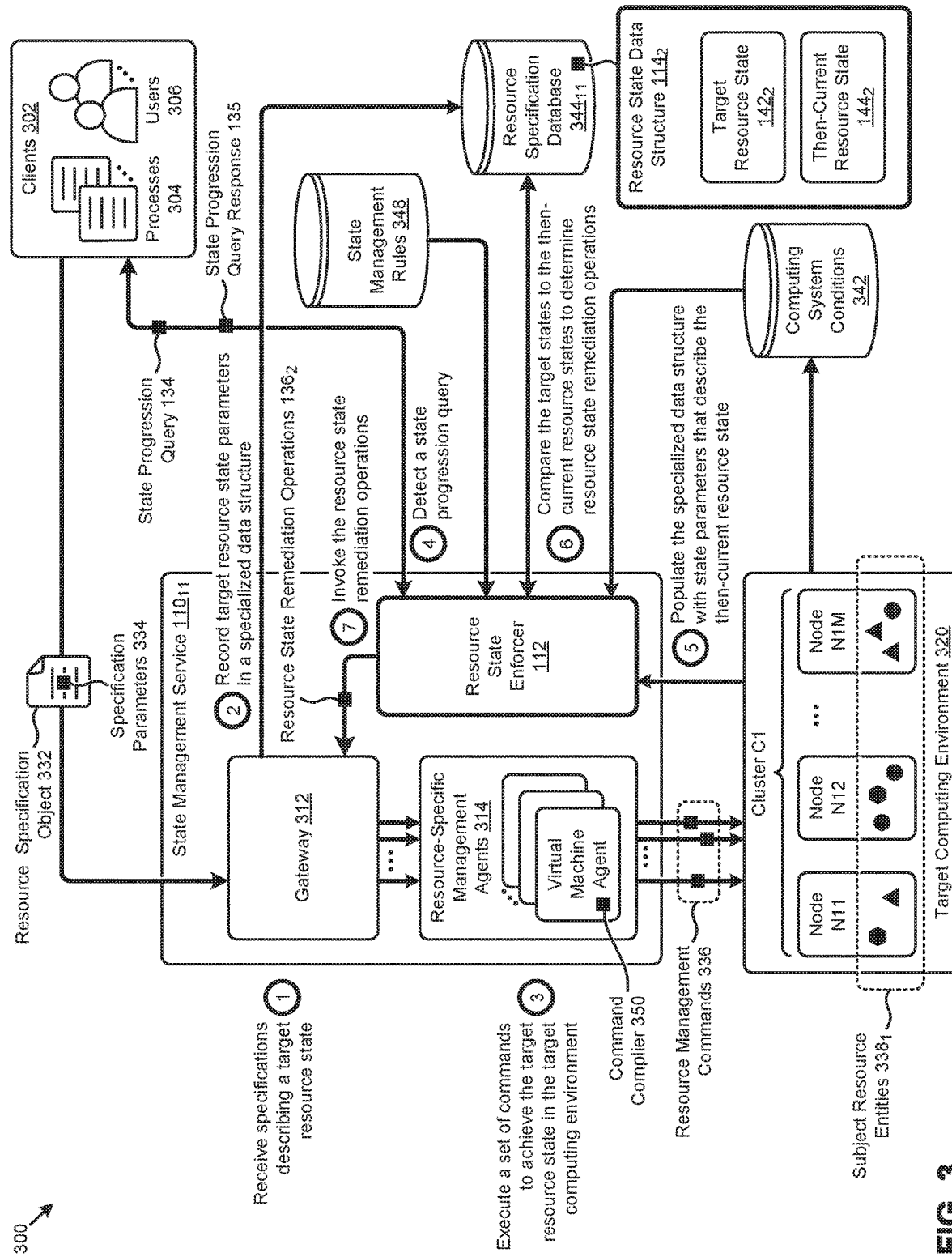
FIG. 3 presents a block diagram of a system for enforcing specified resource states in computing systems, according to an embodiment.

FIG. 3 presents a block diagram of a system 300 for enforcing specified resource states in computing systems. As an option, one or more variations of system 300 or any aspect thereof may be implemented in the context of the architecture and functionality of the embodiments described herein. The system 300 or any aspect thereof may be implemented in any environment.

The embodiment shown in FIG. 3 depicts merely one example of a computing system that supports enforcement of specified resource states in the computing system, according to the herein disclosed techniques. The components, data structures, and data flows shown in FIG. 3 present one partitioning and associated data manipulation approach. The specific example shown is purely exemplary, and other subsystems, data structures, and/or partitioning are reasonable.

Specifically, the system 300 comprises an instance of a state management service (e.g., state management service $110_{11}$) that receives a set of specifications that describe a target resource state (operation 1). As can be observed, a set of specification parameters 334 codified in a resource specification object 332 (e.g., JSON object from a web form) might be received from one or more clients 302. Clients 302 might comprise one or more users 306 and/or one or more computing processes (e.g., processes 304) that issue the various resource specification objects to state management service $110_{11}$ to accomplish respective purposes (e.g., configuring certain resources of the computing system). For example, the resource specification object 332 and its associated specification parameters (e.g., specification parameters 334) might be issued to state management service $110_{11}$ to achieve a target resource state of a set of subject resource entities $338_1$ at a target computing environment 320 (e.g., a cluster "C1" that comprises node "N11", node "N12", . . . , and node "N1M").

The specification parameters 334 that describe such a target resource state are received at state management service $110_{11}$ by a gateway 312. Such a gateway 312 is configured to record specification parameters 334 in a specialized data structure in a resource specification database $344_{11}$ (operation 2). Specifically, the specification parameters 334 comprise a representation of a target resource state $142_2$ in a resource state data structure $114_2$ in the database. Gateway 312 also dispatches occurrences of specification parameters 334 to one or more resource-specific management agents 314 (e.g., a virtual machine agent, etc.). Any one or more of the resource-specific management agents can host a command compiler 350 that serves to generate resource management commands given a target state specification. Various embodiments of such a command compiler are shown and discussed as pertains to FIG. 5B.

Operation of the command compiler results in resource management commands 336 that are invoked for execution so as to achieve the target resource state of the subject resource entities $338_1$ (operation 3). The resource management commands 336 might be scheduled for sequential execution, parallel execution, synchronous execution, asynchronous execution, and/or any combination thereof. The resource-specific management agents are selected by gateway 312 based at least in part on the resource entities (e.g., subject resource entities $338_1$) referenced by the specification parameters 334. In certain embodiments, the resource-specific management agents might be implemented as plug-ins that are accessed from a resource management engine (e.g., an "intent" engine).

At some moment in time, a gateway of state management service $110_{11}$ and/or any one or more resource agents of state management service $110_{11}$ and/or the shown resource state enforcer 112 of state management service $110_{11}$ detects a state progression query 134, possibly as a result of a call to an application programming interface (API) or a call using another mechanism (operation 4). For example, state progression query 134 might be issued by one of the users 306 (e.g., a system administrator) to determine whether the target resource state is established as intended at subject resource entities $338_1$ of target computing environment 320 (e.g., cluster C1). As another example, a background computing process might issue a state progression query 134 in accordance with a predetermined state monitoring schedule. Responsive to receipt of state progression query 134, resource state enforcer 112 populates the resource state data structure $114_2$ with the state parameters that describe a then-current resource state $144_2$ of the subject resource entities $338_1$ of the target computing environment 320 (operation 5).

A response to the aforementioned state progression query 134 might be then formulated and returned to the caller. Alternatively, a response to the state progression query 134 might be returned at a later moment in time. For example, a state progression query response 135 might be returned after one or more remediation actions have been determined and/or initiated. The state progression query 134 and a corresponding state progression query response 135 can be sent/received by any of a variety of clients 302 such as the shown processes and/or such as the shown users.

The resource state enforcer 112 accesses the resource state data structure $114_2$ at resource specification database $344_{11}$ to compare the target resource state $142_2$ to the then-current resource state $144_2$ to determine whether any resource state remediation operations are to be performed (operation 6). The resource state remediation operations (e.g., resource state remediation operations $136_2$) are then invoked at gateway 312 by the resource state enforcer 112 (operation 7). For example, if no state differences between the target resource state and the then-current resource state are discovered, an operation that merely issues a response (e.g., to the client that issued the query) indicating no differences are present might be performed. When state differences are discovered, other resource state remediation operations might be determined and performed to, for example, eliminate one or more (e.g., all) of the discovered state differences. In certain embodiments, one or more of the resource state remediation operations are determined based at least in part on one or more computing system conditions 342. The computing system conditions 342 might comprise data records that indicate, for example, the resources (e.g., nodes, CPUs, memory, storage devices, etc.) available, the resource utilization, and/or other computing system conditions.

As an example, one of the resource management commands 336 from the resource-specific management agents 314 might be waiting for a certain resource (e.g., a failed node) to become available to complete execution of the command so that the target resource state can be achieved. In this case, the resource state enforcer 112 can determine from computing system conditions 342 that the node has failed and accordingly formulate resource state remediation operations (e.g., reschedule the resource management command for processing on an active node) to facilitate achieving the target resource state. The resource state remediation operations might also be based at least in part on one or more state management rules 348. For example, certain resource usage rules from the state management rules 348 might be accessed to determine any constraints as to how computing system resources are deployed, implemented, or otherwise used in one or more resource state remediation operations. The state management rules 348 might be established in accordance with user preferences, policies, and/or other data sources.

Particular embodiments may specify and enforce entity compliance in relation to an API and/or in relation to a remote procedure call (RPC). A computing entity might have any variations of compliance state specifications and/or sub-resource compliance state specifications that correspond to a portion of a target resource state specification. In some embodiments, the compliance portions and/or sub-resource portions are read-only for a particular user or process, whereas the compliance portions and/or sub-resource portions can be read-write for a different user such as an administrator or administrative process. One possible implementation of a compliance check API is given in the following table.

TABLE 1

Sample compliance check API description

| Ref | Information |
|---|---|
| 1 | {/* begin application programming interface description */ |
| 2 | "api_version": "string", |
| 3 | "metadata": { |
| 4 | "type": "compliance" |
| 5 | "enforced_spec": {... } |
| 6 | "UUID": "string" |
| 7 | "description": "string" |
| 8 | "parent_reference": "reference" |
| 9 | "entity_version": "int" |
| 10 | "creation_time": "string" |
| 11 | "last_update_time": "string" |
| 12 | "categories": { |
| 13 | "category_name1": "value1" |
| 14 | "category_name2": "value2" |
| 15 | } |
| 16 | } |

The results of an API call can be used in conjunction with a GUI that shows an indication of entity compliance/non-compliance. Particular embodiments may trigger an alert based at least in part on the nature of the compliance/non-compliance.

The foregoing discusses uses of a resource state data structure, an example of which is described in further detail as follows.

Figure 4:
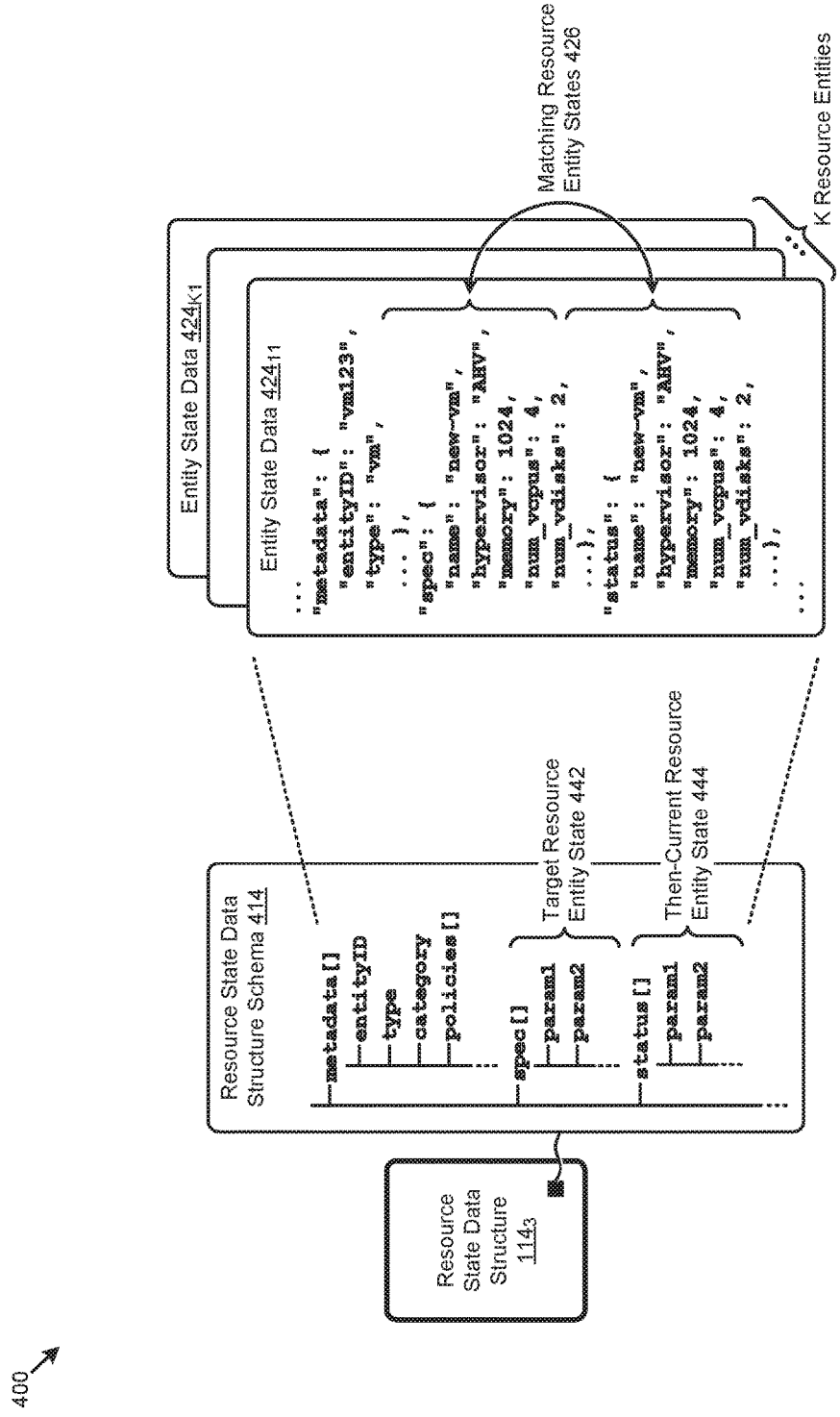
FIG. 4 depicts a specialized data structure that is designed to improve the way that a computer stores and retrieves data in memory when performing steps pertaining to enforcing specified resource states in computing systems.

FIG. 4 depicts a specialized data structure 400 that is designed to improve the way that a computer stores and retrieves data in memory when performing steps pertaining to enforcing specified resource states in computing systems. As an option, one or more variations of specialized data structure 400 or any aspect thereof may be implemented in the context of the architecture and functionality of the embodiments described herein. The specialized data structure 400 or any aspect thereof may be implemented in any environment.

FIG. 4 depicts one embodiment of a resource state data structure schema 414 for an instance of resource state data structure 114$_3$ earlier described. As can be observed, the resource state data structure schema 414 indicates that data stored in resource state data structure 114$_3$ might be organized and/or stored in a tabular structure (e.g., relational database table) that has rows that relate various attributes to a particular resource entity. As another example, the information might be organized and/or stored in a programming code object that has instances corresponding to a particular resource entity and properties corresponding to the various attributes associated with the resource entity.

As depicted in resource state data structure schema 414, a data record (e.g., table row or object instance) for a particular resource entity might have a metadata section (e.g., in a "metadata[ ]" object) that includes a resource entity identifier (e.g., stored in an "entityID" field), a resource entity type identifier (e.g., stored in a "type" field), a category identifier (e.g., "production" or "engineering" stored in a "category" field), a list of referenced policies (e.g., stored in a "policy[ ]" object), and/or other metadata. The data record might further comprise a specification section (e.g., in a "spec[ ]" object) that includes a set of specification parameters (e.g., stored in a "param1" field, a "param2" field, etc.) associated with the resource entity. To facilitate the herein disclosed techniques, the set of parameters in the "spec[ ]" object might represent a target resource entity state 442 for a particular resource entity. A data record for a resource entity might further comprise a status section (e.g., in a "status [ ]" object) that includes a set of state parameters (e.g., stored in a "param1" field, a "param2" field, etc.) associated with the resource entity. To facilitate the herein disclosed techniques, the set of parameters in the "status [ ]" object might represent a then-current resource entity state 444 for a particular resource entity. Other information not shown in the resource state data structure schema 414 can be stored in instances of the resource state data structure.

FIG. 4 further depicts a set of representative resource entity state data (e.g., entity state data 424$_{11}$, . . . , entity state data 424$_{K1}$) organized according to the resource state data structure schema 414 for a respective K resource entities. Specifically, entity state data 424$_{11}$ indicates the representative attributes shown are associated with a virtual machine (e.g., "type"="vm") entity identified as "vm123". As can be observed by a comparison of the particular attributes (e.g., "name", "hypervisor", "memory", "num_vcpus", and "num_vdisks") shown in the "spec" and "status" sections, this "vm123" resource entity has matching resource entity states 426 (e.g., matching target resource entity state and the then-current resource entity state). In this case, according to the herein disclosed techniques, no resource state remediation operations might be invoked due to the matching states.

In other cases, resource state comparison operations (e.g., resource state comparison operations 250 of FIG. 2) might invoke one or more resource state remediation operations, as disclosed in further detail as follows.

Figure 5A:
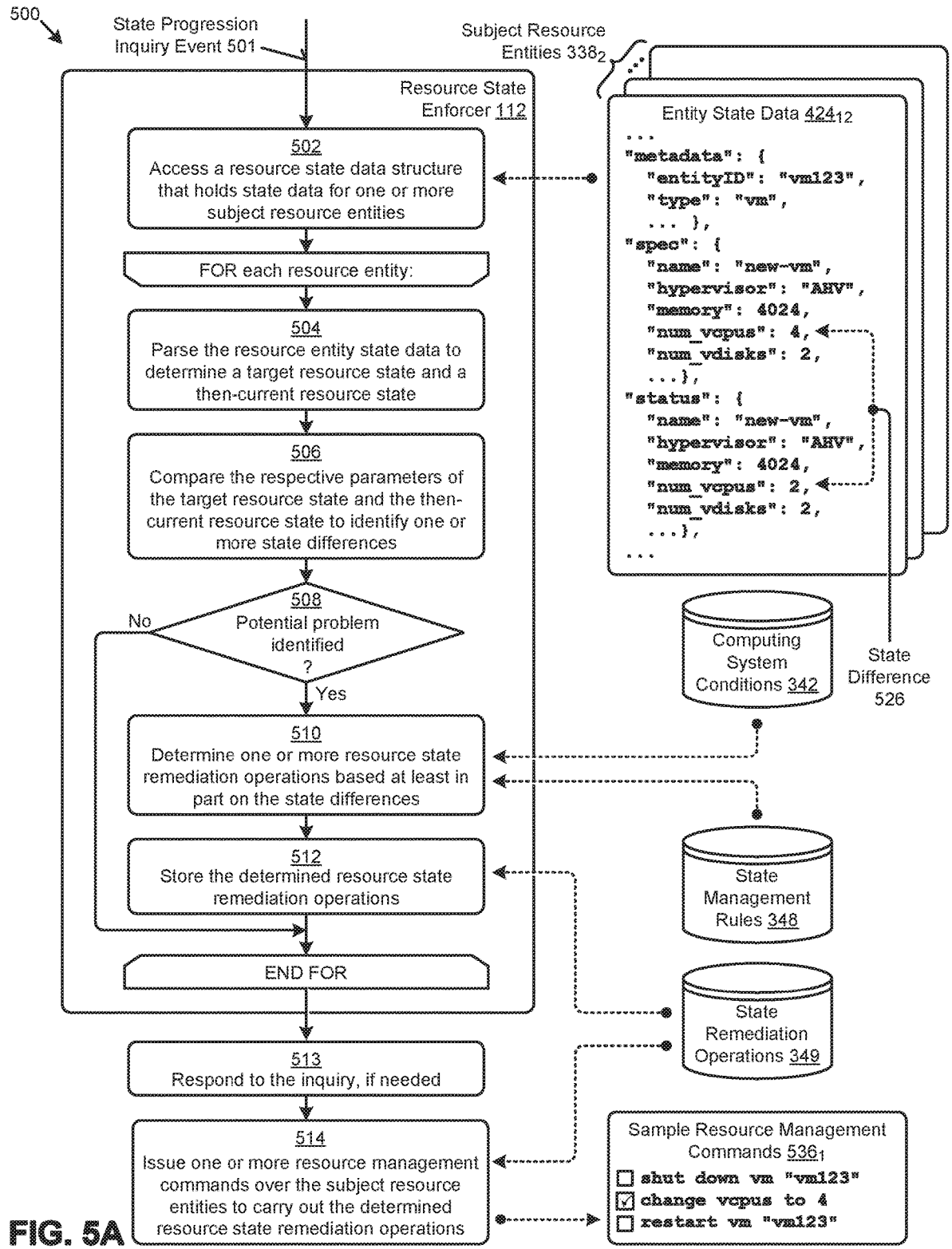
FIG. 5A presents a resource state comparison technique as implemented in systems that facilitate enforcing specified resource states in computing systems, according to an embodiment.

FIG. 5A presents a resource state comparison technique 500 as implemented in systems that facilitate enforcing specified resource states in computing systems. As an option, one or more variations of resource state comparison technique 500 or any aspect thereof may be implemented in the context of the architecture and functionality of the embodiments described herein. The resource state comparison technique 500 or any aspect thereof may be implemented in any environment.

The resource state comparison technique 500 presents one embodiment of certain steps and/or operations that invoke resource state remediation operations to enforce specified resource states in computing systems. Various illustrations, specialized data structures, and sample data are also presented to further describe certain aspects of the resource state comparison technique 500.

This embodiment of resource state comparison technique 500 includes an instance of resource state enforcer 112. The resource state enforcer can periodically compare the then-current entity state data to find differences, and then to remediate or "enforce" attainment of a desired target states. Combinations of state differences and computing system conditions are used as operands to state management rules, the application of which rules in turn emit remediation operations that serve to address potential problems encountered during the pursuit of the specified target state.

As shown, the resource state comparison technique 500 might be implemented in an instance of resource state enforcer 112. The resource state comparison technique 500 can commence at any time. In some cases, commencement is on a time schedule. In other cases, commencement occurs based on a state progression inquiry event 501 raised by any source, such as resulting from a user inquiry in the form of a state progression query 134. Processing within the shown resource state enforcer commences upon accessing a resource state data structure that holds state data for one or more subject resource entities (step 502). For example, the shown instance of entity state data 424$_{12}$ from the corpus of state data corresponding to subject resource entities 338$_2$ might be accessed. As can be observed, entity state data 424$_{12}$ is associated with resource entity "vm123".

For each resource entity (e.g., resource entity "vm123") from the subject resource entities 338$_2$, the resource entity state data is parsed to extract or otherwise determine parameters describing a target resource state and a then-current resource state (step 504). For example, the parameters in the "spec" object of entity state data 424$_{12}$ can represent a target resource state for entity "vm123" and the parameters in the "status" object of entity state data 424$_{12}$ can represent a then-current resource state for entity "vm123". The respective parameters of the target resource state and the then-current resource state are compared to identify one or more state differences (step 506). As shown, a state difference 526 pertaining to the "num_vcpus" attributes is present in the entity state data 424$_{12}$. The state difference 526 may exist due to a manual override (e.g., by a user) of the number of CPUs associated with the virtual machine "vm123".

A state difference might be indicative of a problem. Or, a state difference might occur merely because the target state pursuit is in a normal progression and merely more time is needed to achieve the specified target state. Decision 508 serves to determine if the state difference is indicative of a potential problem to be addressed (e.g., a specification conflict to be remediated). If decision 508 deems that there are no immediate potential problem to be addressed and/or there are no state differences detected (see "No" path of decision 508), then the target resource state for the resource entity either has been achieved (if there are no state differences) or decision 508 deems that the ongoing target state pursuit progression is normal, thus no remediation actions would be needed at this point in time. However, if there are potential problems detected, and/or if there are one or more state differences identified (see "Yes" path of decision 508), one or more resource state remediation operations are determined based at least in part on the nature of the potential problem and/or the identified state differences (step 510). In some cases, a set of computing system conditions 342 and/or a set of state management rules 348 are consulted when determining the resource state remediation operations. Such rules can be used to identify remediation actions. In some cases, remediation operations can be immediately invoked. In other cases, the rules might merely record certain then-current conditions of the system or environment and defer remediation processing until a future moment in time, such as a future moment when the resource state enforcer 112 is again invoked (e.g., due to invocation on a time schedule or invocation based on receipt of a state progression inquiry event 501).

In cases when the resource state enforcer was invoked in response to an inquiry event such as an occurrence of a state progression query, the results of the query processing are returned to the caller (step 513).

In some cases, and as indicated by step 512, resource state remediation operations are stored as state remediation operations 349, which can be accessed by other components of the system. In some cases, the resource state remediation operations are invoked and carried out by multiple components of the system so as to facilitate remediation (e.g., elimination) of the detected potential problem and/or remediation (e.g., elimination) of the remaining state differences. For example, the stored occurrences of state remediation operations 349 are accessed, and one or more resource management commands are issued over subject resource entities to carry out the determined resource state remediation operations (step 514). As a specific example, and as shown by sample resource management commands 536$_1$, in order to remediate the state difference 526, one or more resource management commands corresponding to "change vcpus to 4" might be issued over resource entity "vm123".

The foregoing is presented for illustration, and is merely one possible embodiment. Variations of the foregoing embodiment or other particular embodiments may receive state requests comprising target state specifications for a particular entity or for a list of particular entities. In some embodiments, when an entity specification is updated for a particular entity, particular embodiments may acknowledge receipt of the request, then record the updated specification in a configuration database together with an updated value of the entity version parameter for that particular entity. The various aspects of the request may be added to a write-ahead log (WAL), and then particular embodiments may check placement, policies, and availability of resources as required by the request.

Particular embodiments may parse the request into sub-state transition requests. Particular embodiments may include multiple modules to (1) identify one or more steps required to evolve the current state of the virtualization environment to attain the target state, and (2) to attempt to perform the one or more steps. Particular embodiments may take a snapshot of the current state as a backup in case the steps required to evolve the current state of the virtualization environment cannot be completed. In some cases, if required resources are unavailable to perform any one or more of the steps, particular embodiments may roll back changes made as part of the state transition request and retry later. Some embodiments may continuously attempt to evolve the current state of the virtualization environment until the target state has been achieved. Some embodiments provide a mechanism for efficient execution based on load characteristics of the system. Some embodiments provide an efficient algorithm for bulk update of large number of time-to-live (TTL) indications that have expired. Some embodiments provide a watcher for multiple TTL expirations. Some embodiments provide an intelligent retry mechanism to reprocess operations to achieve the target state based on a back off and retry algorithm. Some embodiments provide a quality-of-service based approach to process retries without causing starvation of other processes in the system.

Further details regarding general approaches to managing data repositories are described in U.S. patent application Ser. No. 15/818,704 titled "EXECUTING RESOURCE MANAGEMENT OPERATIONS IN DISTRIBUTED COMPUTING SYSTEMS", filed on Nov. 20, 2017, which is hereby incorporated by reference in its entirety.

Figure 5B:
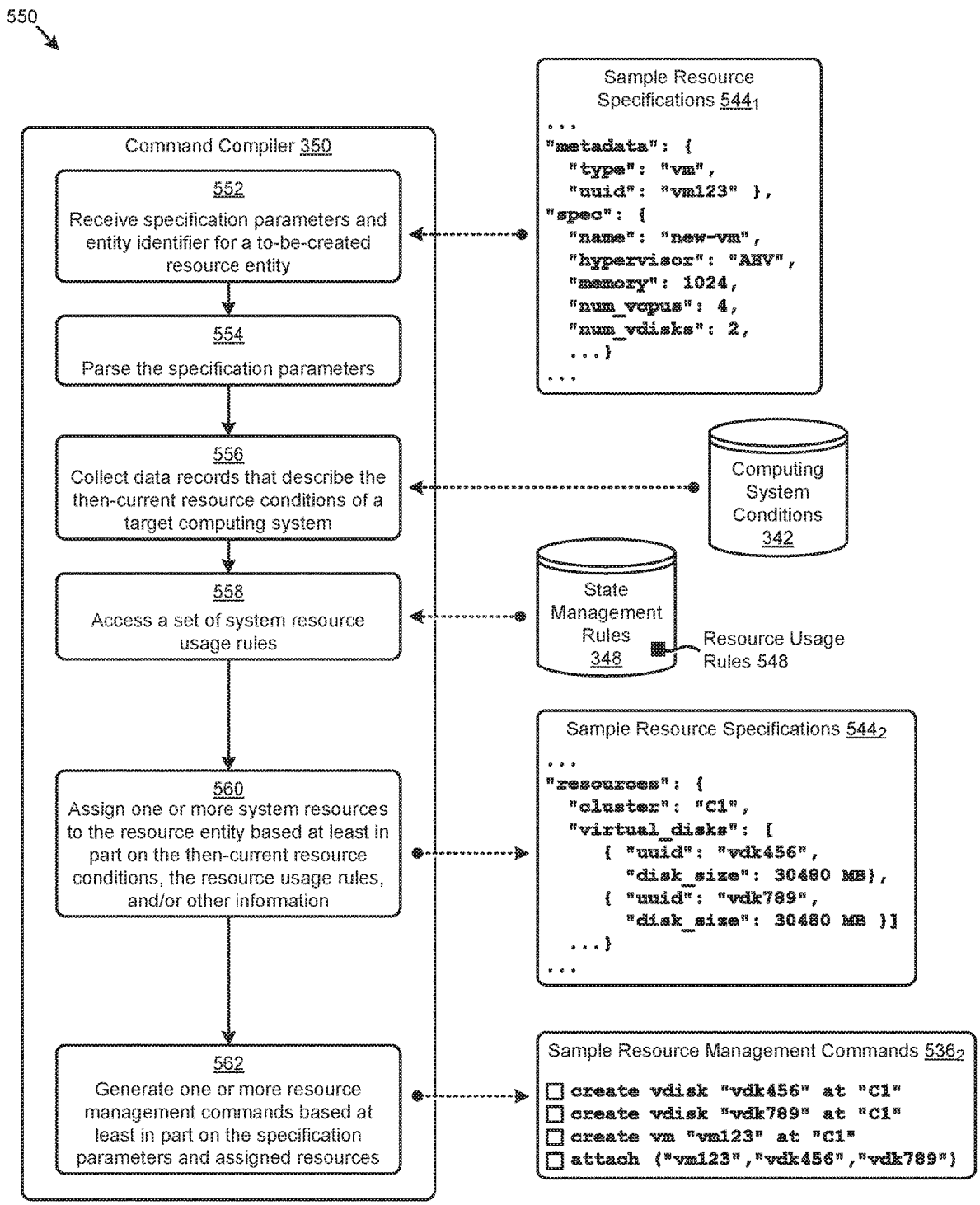
FIG. 5B depicts a resource command generation technique as used in systems for configuring computing systems using resource state specifications, according to an embodiment.

FIG. 5B depicts a resource command generation technique 550 as used in systems for configuring computing systems using resource state specifications. As an option, one or more variations of the resource command generation technique 550 or any aspect thereof may be implemented in the context of the architecture and functionality of the embodiments described herein. The resource command generation technique 550 or any aspect thereof may be implemented in any environment.

The resource command generation technique 550 presents one embodiment of certain steps and/or operations that automatically generate resource management commands that are used to facilitate configuring computing systems using resource state specifications. Various illustrations, specialized data structures, and sample data are also presented to further describe certain aspects of the resource command generation technique 550. As shown, the resource command generation technique 550 might be implemented in the command compiler 350 of any one or more of the resource-specific management agents as earlier presented and described as pertains to FIG. 3. The resource command generation technique 550 can be implemented in the command compiler of any respective resource-specific management agent.

The resource command generation technique 550 can commence by receiving a set of specification parameters and an associated entity identifier for a to-be-created resource entity (step 552). In some embodiments, the set of specification parameters and respective entity identifiers are received at a resource-specific management agent (e.g., entry point, thread, method subroutine, etc.) of the compiler. Strictly as an example, the specification parameters derived from sample resource specifications $544_1$ might be associated with a virtual machine identified as "vm123". Sample resource specifications $544_1$ can represent a target resource entity state for virtual machine "vm123". The resource specifications can be codified using any known techniques. As can be observed, sample resource specifications $544_1$ are structured to facilitate transmission to the resource-specific management agent using JSON. JSON is merely a convenient representation of data that can be easily parsed. The received specification parameters are parsed (step 554), possibly using any set of commercially-available JSON parsers that convert JSON text into a Java object and vice-versa. For example, sample resource specifications $544_1$ can be parsed by a JSON parser to determine various key-value pairs (e.g., "memory":1024, "num_vdisks":2, etc.).

The resource command generation technique 550 also collects data records that described the then-current resource condition of a target computing system (step 556). Such conditions might be collected from computing system conditions 342 and indicate, for example, a set of system resources that are available (e.g., nodes, CPUs, memory, storage devices, etc.), the resource utilization, and/or other computing system conditions. With respect to a set of respective system resources, the then-current resource conditions can be combined into a pattern or template. For example, if a virtual machine specification calls for a two CPUs and one GB of memory, characteristics of the matched pattern or template might include a sequence of commands that serve for (1) determining a set of nodes that are feasible for hosting the VM, (2) determining which of the feasible nodes are to be considered for load balancing and/or resilience, (3) determining one or more optimal allocations of the VM and its resources onto one or more nodes, and (4) determining a listing of write-ahead log entries that are to be used for monitoring and ongoing compliance/enforcement. In some cases, any/all of the foregoing determinations involve combining templates and applicable rules. Strictly as one example, if a virtual machine specification calls for a two CPUs, each with respective memory demands then, on the basis of the demand for two CPUs, a resource usage rule might be fired such that a determination is made as to what order to schedule the assignments (e.g., node assignments) and allocations (e.g., memory allocations). In some cases, a resource usage rule might include scheduling information such that parallelization can be implemented for some of the actions.

As shown, the command compiler 350 accesses a set of system resource usage rules (step 558). For example, resource usage rules 548 might be accessed to determine any constraints pertaining to how computing system resources are compliantly deployed, implemented, or otherwise used. Resource usage rules 548 might be established in accordance with user preferences, policies, and/or other data sources.

Based at least in part on the then-current resource conditions and/or resource usage rules, one or more system resources are assigned to the specified resource entity (step 560). As shown in the "resources" section of the sample resource specifications $544_2$, a specific set of virtual disks (e.g., virtual disk "vdk456" and virtual disk "vdk789") from cluster "C1" are listed. In this example, the resource usage rules 548 depicts an indication that the two virtual disks for virtual machine "vm123" are to be sized at "30480" MB, and the then-current resource conditions indicate that cluster "C1" has sufficient storage available for these virtual disks. A set of one or more resource management commands are then generated based at least in part on the specification parameters and assigned resources (step 562). As an example, sample resource management commands $536_2$ depict four commands that might be generated by command compiler 350 to implement the target resource entity state depicted by sample resource specifications $544_1$ in accordance with the computing system conditions 342 and/or resource usage rules 548.

Further details regarding general approaches making and using command compilers are described in U.S. patent application Ser. No. 15/842,436 titled "SPECIFICATION-BASED COMPUTING SYSTEM CONFIGURATION", filed on Dec. 14, 2017, which is hereby incorporated by reference in its entirety.

The foregoing discussions describe several of the herein disclosed techniques as being implemented in any computing system or any computing environment. One particular distributed virtualization computing environment in which embodiments of the present disclosure can be implemented is disclosed as follows.

Figure 6:
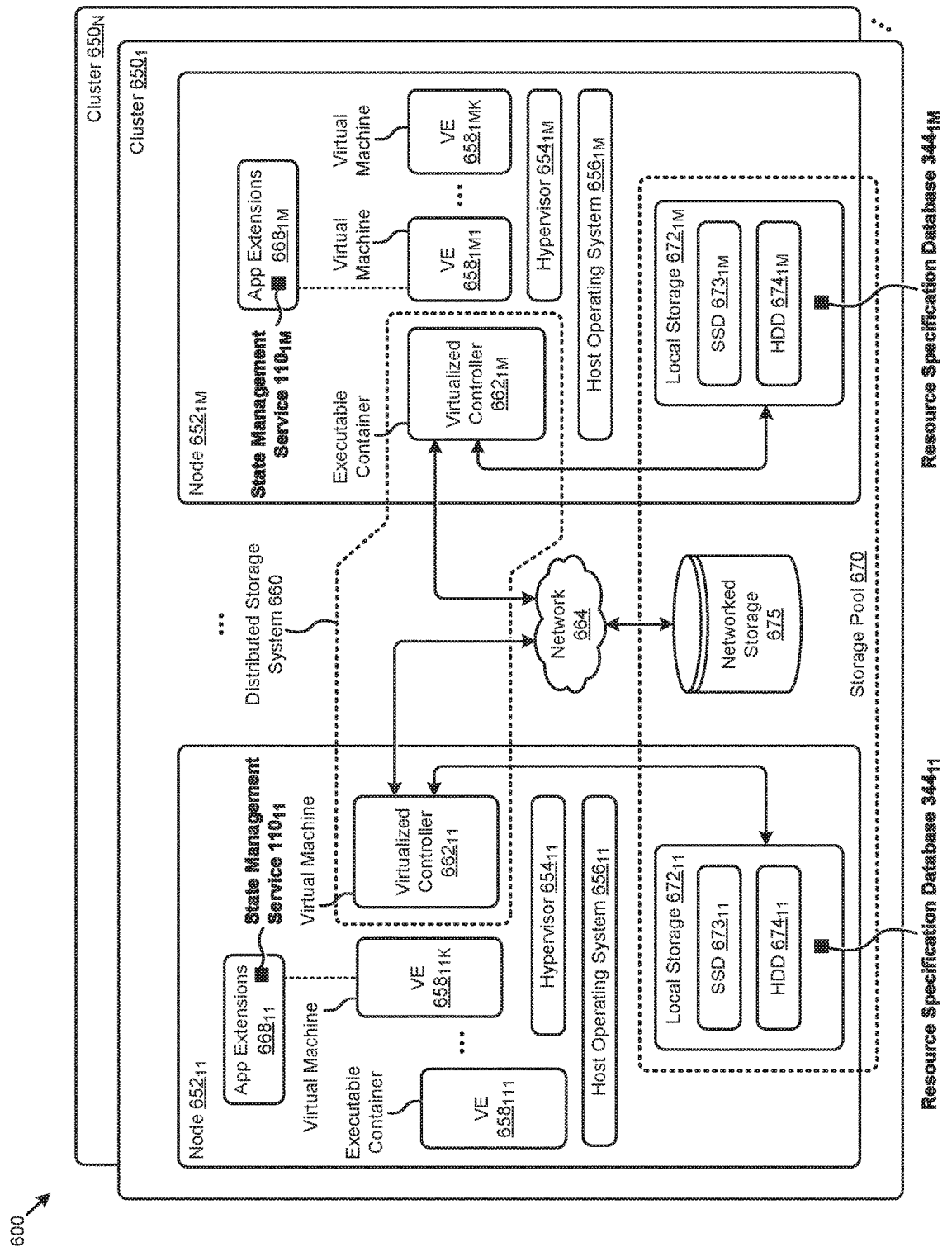
FIG. 6 depicts a distributed virtualization environment in which embodiments of the present disclosure can be implemented.

FIG. 6 depicts a distributed virtualization environment 600 in which embodiments of the present disclosure can be implemented. As an option, one or more variations of distributed virtualization environment 600 or any aspect thereof may be implemented in the context of the architecture and functionality of the embodiments described herein.

The shown distributed virtualization environment depicts various components associated with one instance of a distributed virtualization system (e.g., hyperconverged distributed system) comprising a distributed storage system 660 that can be used to implement the herein disclosed techniques. Specifically, the distributed virtualization environment 600 comprises multiple clusters (e.g., cluster $650_1, \ldots,$ cluster $650_N$) comprising multiple nodes that have multiple tiers of storage in a storage pool. Representative nodes (e.g., node $652_{11}, \ldots,$ node $652_{1M}$) and storage pool 670 associated with cluster $650_1$ are shown. Each node can be associated with one server, multiple servers, or portions of a server. The nodes can be associated (e.g., logically and/or physically) with the clusters. As shown, the multiple tiers of storage include storage that is accessible through a network 664, such as a networked storage 675 (e.g., a storage area network or SAN, network attached storage or NAS, etc.). The multiple tiers of storage further include instances of local storage (e.g., local storage $672_{11}$, ..., local storage $672_{1M}$). For example, the local storage can be within or directly attached to a server and/or appliance associated with the nodes. Such local storage can include solid state drives (SSD $673_{11}$, ..., SSD $673_{1M}$), hard disk drives (HDD $674_{11}$, HDD $674_{1M}$), and/or other storage devices.

As shown, the nodes in distributed virtualization environment 600 can implement one or more user virtualized entities (e.g., VE $658_{111}$, VE $658_{11K}$, VE $658_{1M1}$, VE $658_{1MK}$, such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $656_{11}$, ..., host operating system $656_{1M}$), while the VMs run multiple applications on various respective guest operating systems. Such flexibility can be facilitated at least in part by a hypervisor (e.g., hypervisor $654_{11}$, hypervisor $654_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $656_{11}$, ..., host operating system $656_{1M}$) without, in most cases, a hypervisor layer. This lightweight implementation can facilitate efficient distribution of certain software components, such as applications or services (e.g., micro-services). As shown, distributed virtualization environment 600 can implement both a hypervisor-assisted virtualization environment and a container virtualization environment for various purposes.

Distributed virtualization environment 600 also comprises at least one instance of a virtualized controller to facilitate access to storage pool 670 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 660 which can, among other operations, manage the storage pool 670. This architecture further facilitates efficient scaling of the distributed virtualization system. The foregoing virtualized controllers can be implemented in distributed virtualization environment 600 using various techniques. Specifically, an instance of a virtual machine at a given node can be used as a virtualized controller in a hypervisor-assisted virtualization environment to manage storage and I/O (input/output or JO) activities. In this case, for example, the virtualized entities at node $652_{11}$ can interface with a controller virtual machine (e.g., virtualized controller $662_{11}$) through hypervisor $654_{11}$ to access the storage pool 670. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 660.

For example, a hypervisor at one node in the distributed storage system 660 might correspond to VMware ESXi software, and a hypervisor at another node in the distributed storage system 660 might correspond to Nutanix AHV software. As another virtualized controller implementation example, containers (e.g., Docker containers) can be used to implement a virtualized controller (e.g., virtualized controller $662_{1M}$) in an operating system virtualization environment at a given node. In this case, for example, the virtualized entities at node $652_{1M}$ can access the storage pool 670 by interfacing with a controller container (e.g., virtualized controller $662_{1M}$) through hypervisor $654_{1M}$ and/or the kernel of host operating system $656_{1M}$.

In certain embodiments, one or more instances of a state management service comprising a respective resource state enforcer can be implemented in the distributed virtualization environment 600 to facilitate the herein disclosed techniques. In certain embodiments, the state management service can be implemented as an application extension (e.g., app extension) managed by a virtualized entity (e.g., VM, executable container, etc.). More specifically, the state management service might be implemented as a containerized application extension managed by a virtualized container service machine.

As shown in FIG. 6, state management service $110_{11}$ is implemented in a set of app extensions $668_{11}$ managed by VE $658_{11K}$ (e.g., a virtualized container service machine) in node $652_{11}$, and state management service $110_{1M}$ is implemented in a set of app extensions $668_{1M}$ managed by VE $658_{1M1}$ (e.g., a virtualized container service machine) in node $652_{1M}$. In other embodiments, instances of the state management service are implemented in respective instances of the virtualized controller. Such instances of the virtualized controller, the state management service, the resource state enforcer, the app extensions, and/or the virtualized service machines can be implemented in any node in any cluster. Actions taken by one or more instances of the state management service and/or virtualized controller can apply to a node (or between nodes), and/or to a cluster (or between clusters), and/or between any resources or subsystems accessible by the virtualized controller or their agents (e.g., state management service).

As further shown, the metadata and datastores associated with the herein disclosed techniques can be stored in various storage facilities in storage pool 670. As an example, a portion of the resource specification database (e.g., resource specification database $344_{11}$) comprising an instance of a resource state data structure might be stored at local storage $672_{11}$, and another portion of the resource specification database (e.g., resource specification database $344_{1M}$) comprising another instance of a resource state data structure might be stored at local storage $672_{1M}$. In some cases, the entire resource specification database is stored in another location (e.g., in the storage pool) and made accessible to the nodes. In still other cases, the entire resource specification database is stored in a location outside of the storage pool.

ADDITIONAL EMBODIMENTS OF THE DISCLOSURE

Additional Practical Application Examples

Figure 7A:
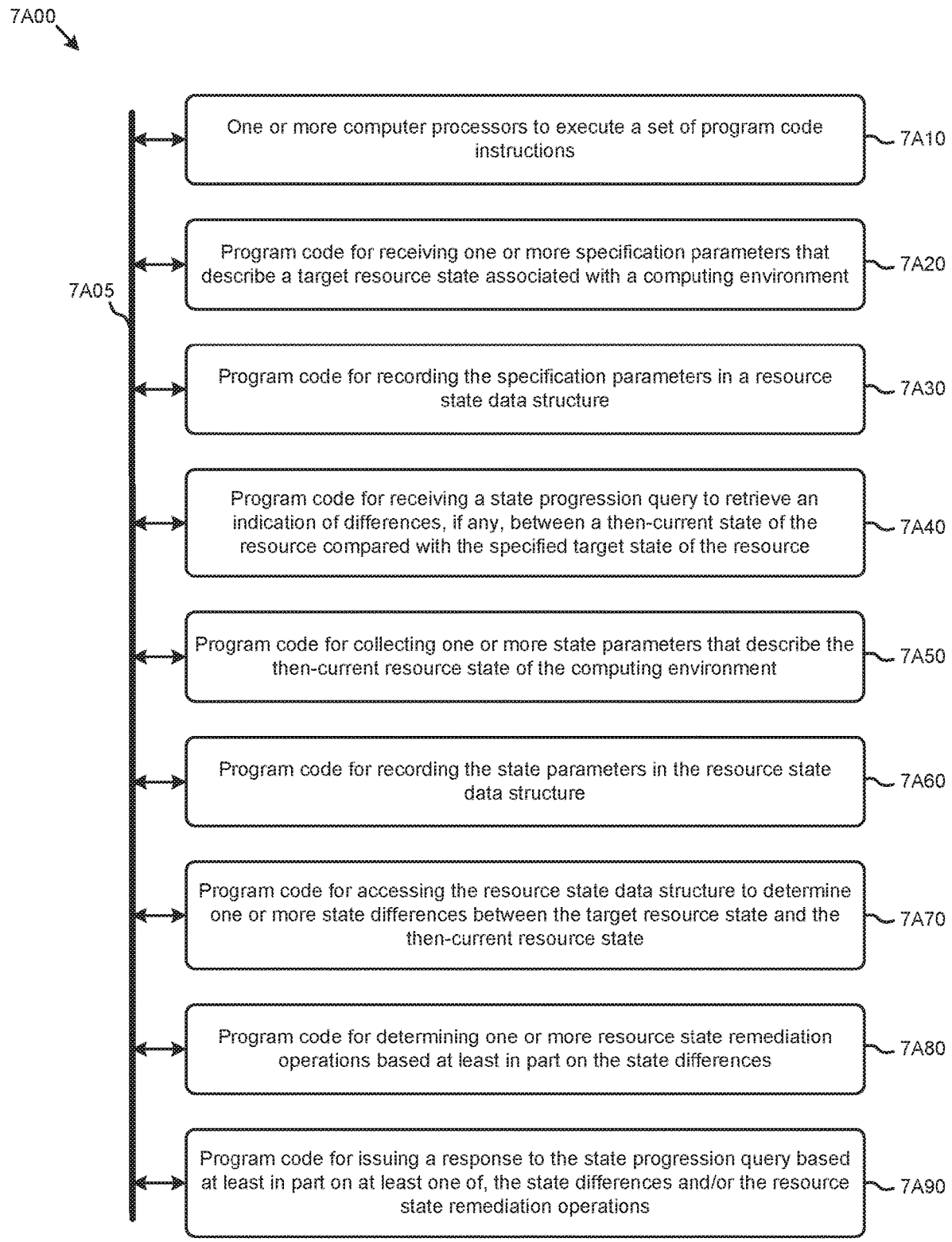
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually and/or as combined, serve to form improved technological processes that facilitate achieving and maintaining specified resource states in rapidly changing computing systems. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: receiving one or more specification parameters that describe a target resource state associated with a computing environment (module 7A20); recording the specification parameters in a resource state data structure (module 7A30); receiving a state progression query to retrieve an indication of differences, if any, between a then-current state of the resource compared with the specified target state of the resource (module 7A40); collecting one or more state parameters that describe the then-current resource state of the computing environment (module 7A50); recording the state parameters in the resource state data structure (module 7A60); accessing the resource state data structure to determine one or more state differences between the target resource state and the then-current resource state (module 7A70); determining one or more resource state remediation operations based at least in part on the state differences (module 7A80); and issuing a response to the state progression query based at least in part on at least one of, the state differences and/or the resource state remediation operations (module 7A90).

Variations of the foregoing may include more or fewer of the shown modules. Certain variations may perform more or fewer (or different) steps, and/or certain variations may use data elements in more, or in fewer (or different) operations. Still further, some embodiments include variations in the operations performed, and some embodiments include variations of aspects of the data elements used in the operations.

Figure 7B:
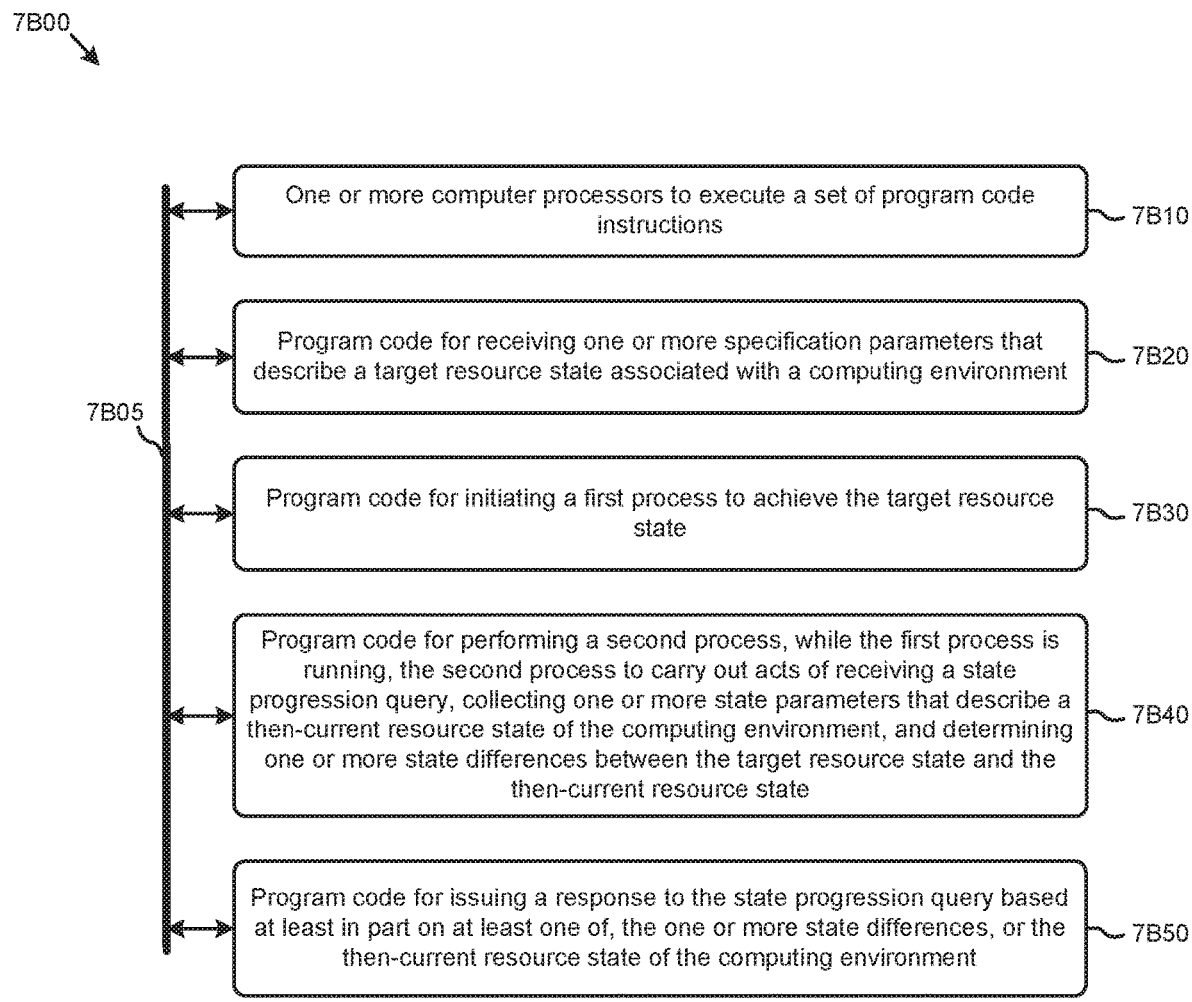

FIG. 7B depicts a system 7B00 as an arrangement of computing modules that are interconnected so as to operate cooperatively to implement certain of the herein-disclosed embodiments. This and other embodiments present particular arrangements of elements that, individually and/or as combined, serve to form improved technological processes that facilitate achieving and maintaining specified resource states in rapidly changing computing systems. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising one or more computer processors to execute a set of program code instructions (module 7B10) and modules for accessing memory to hold program code instructions to perform: receiving one or more specification parameters that describe a target resource state associated with a computing environment (module 7B20); initiating a first process to achieve the target resource state based on commands that are output by a compiler that receives inputs in the form of one or more specification parameters describing a target resource state (module 7B30); performing a second process, while the first process is running, the second process to carry out acts of receiving a state progression query, collecting one or more state parameters that describe a then-current resource state of the computing environment, and determining one or more state differences between the target resource state and the then-current resource state (module 7B40); and issuing a response to the state progression query based at least in part on at least one of, the one or more state differences, or the then-current resource state of the computing environment (module 7B50).

System Architecture Overview

Additional System Architecture Examples

Figure 8A:
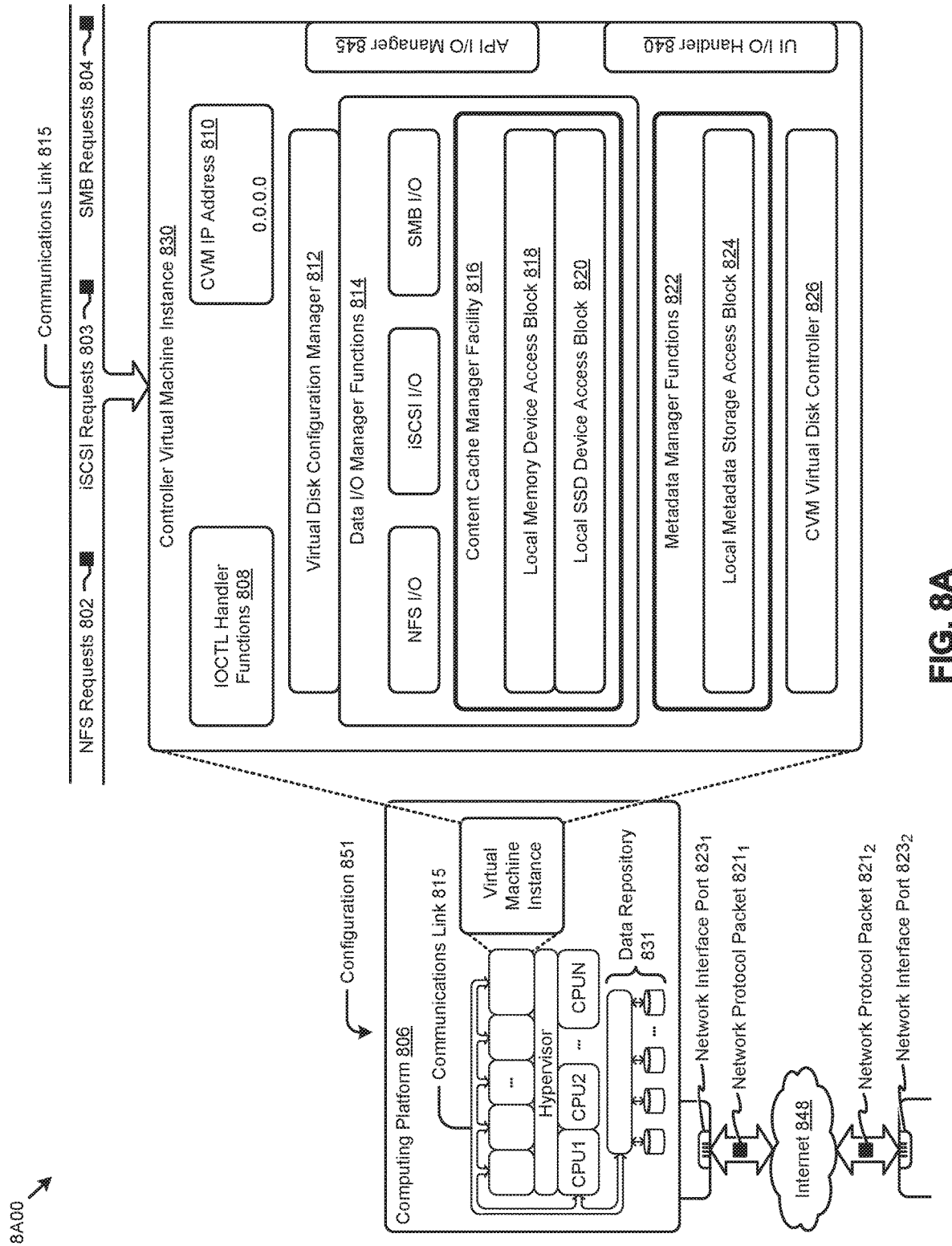
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or JO) as received from any or every source within the computing platform. An example implementation of such a virtual machine that processes storage I/O is depicted as 830.

In this and other configurations, a controller virtual machine instance receives block I/O (input/output or JO) storage requests as network file system (NFS) requests in the form of NFS requests 802, and/or internet small computer storage interface (iSCSI) block JO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or JO) can be handled by one or more JO control handler functions (e.g., IOCTL handler functions 808) that interface to other functions such as data JO manager functions 814 and/or metadata manager functions 822. As shown, the data JO manager functions can include communication with virtual disk configuration manager 812 and/or can include direct or indirect communication with any of various block JO functions (e.g., NFS JO, iSCSI JO, SMB JO, etc.).

In addition to block JO functions, configuration 851 supports JO of any form (e.g., block JO, streaming JO, packet-based JO, HTTP traffic, etc.) through either or both of a user interface (UI) handler such as UI JO handler 840 and/or through any of a range of application programming interfaces (APIs), possibly through API JO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 830 includes content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to enforcing specified resource states in computing systems. In some embodiments, a module may include one or more state machines and/or combinational logic used to implement or facilitate the operational and/or performance characteristics pertaining to enforcing specified resource states in computing systems.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of enforcing specified resource states in computing systems). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to enforcing specified resource states in computing systems, and/or for improving the way data is manipulated when performing computerized operations pertaining to continually comparing the then-current states of computing resources to corresponding target states of computing resources to determine actions to take to achieve the target states.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
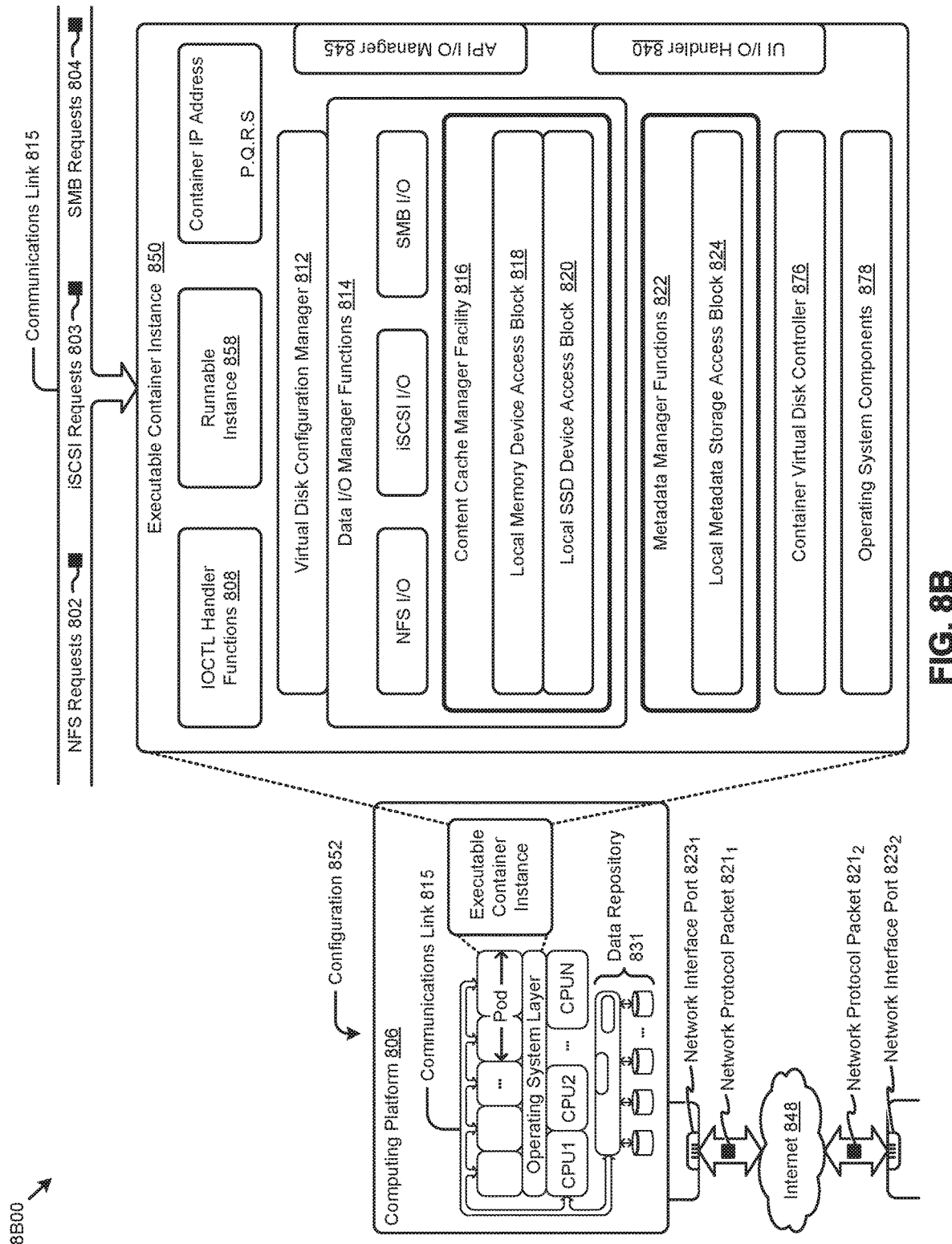

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to the executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
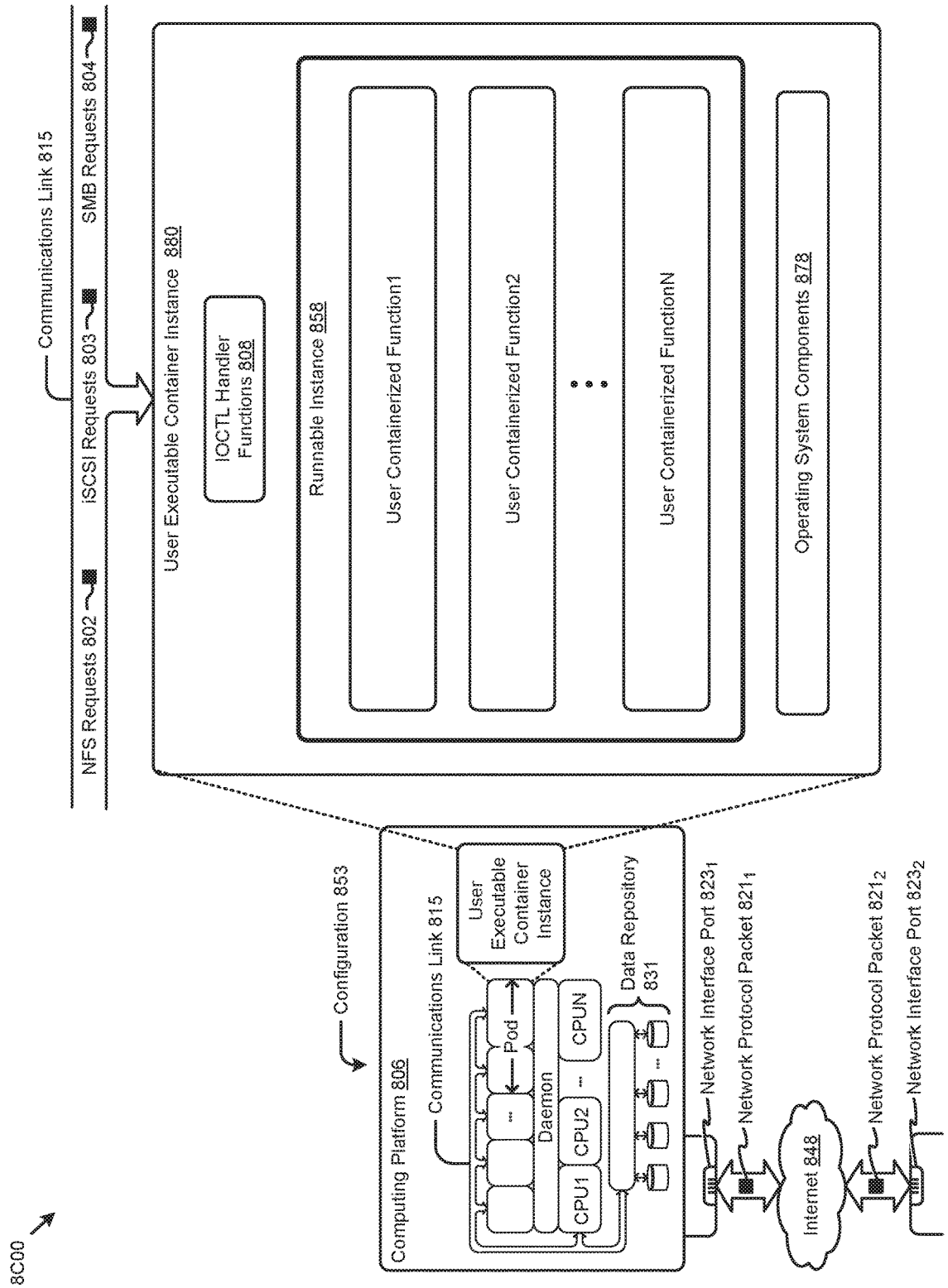

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
executing a resource management command at a processor to achieve a target resource state in a distributed virtualization computing environment;
receiving a state progression query while executing the resource management command, wherein the state progression query comprising requests for retrieval of differences between a current resource state and the target resource state and for resource state remediation operations to be applied to the current resource state;
determining a state difference between the target resource state and the current resource state;
determining a resource state remediation operation based on the state difference and a state management rule; and issuing a response to the state progression query including the state difference and resource state remediation operations to achieve the target resource state.

2. The method of claim 1, further comprising invoking the resource state remediation operation.

3. The method of claim 1, further comprising generating the resource management command based at least in part on a specification parameter that describes the target resource state of the distributed virtualization computing environment.

4. The method of claim 1, wherein the state progression query is issued by at least one of a user or a computing process.

5. The method of claim 1, further comprising invoking a second resource state remediation operation.

6. The method of claim 5, further comprising deferring processing of further resource state remediation operations.

7. A non-transitory computer readable medium having stored thereon a sequence of instructions which, when executed by a processor causes a set of acts, comprising:
  initiating a resource management command at the processor to achieve a target resource state in a distributed virtualization computing environment;
  receiving a state progression query while executing the resource management command, wherein the state progression query comprising requests for retrieval of differences between a current resource state and the target resource state and for resource state remediation operations to be applied to the current resource state;
  determining a state difference between the target resource state and the current resource state;
  determining a resource state remediation operation based on the state difference and a state management rule; and
  issuing a response to the state progression query including the state difference and resource state remediation operations to achieve the target resource state.

8. The computer readable medium of claim 7, the set of acts further comprising invoking the resource state remediation operation.

9. The computer readable medium of claim 7, further comprising generating the resource management command based at least in part on a specification parameter that describes the target resource state of the distributed virtualization computing environment.

10. The computer readable medium of claim 7, wherein the state progression query is issued by at least one of a user or a computing process.

11. The computer readable medium of claim 7, the set of acts further comprising invoking a second resource state remediation operation.

12. The computer readable medium of claim 11, the set of act further comprising deferring processing of further resource state remediation operations.

13. A system comprising:
  a storage medium having stored thereon a sequence of instructions; and
  a processor that executes the sequence of instructions to perform a set of acts, the set of acts comprising:
    initiating a resource management command process at the processor to achieve a target resource state in a distributed virtualization computing environment;
    receiving a state progression query while executing the resource management command process, wherein the state progression query comprising requests for retrieval of differences between a current resource state and the target resource state and for resource state remediation operations to be applied to the current resource state;
    determining a state difference between the target resource state and the current resource state;
    determining a resource state remediation operation based on the state difference and a state management rule; and
    issuing a response to the state progression query including the state difference and resource state remediation operations to achieve the target resource state.

14. The system of claim 13, further comprising generating the resource management command based at least in part on a specification parameter that describes the target resource state of the distributed virtualization computing environment.

15. A non-transitory computer readable medium having stored thereon a sequence of instructions which, when executed by a processor causes a set of acts, comprising:
  executing a resource management command to achieve a target resource state in a distributed virtualization computing environment, wherein the process to achieve the target resource state comprises generating the resource management command based at least in part on a specification parameter that describes the target resource state of the distributed virtualization computing environment;
  retrieving an indication of differences in a current resource state of the distributed virtualization computing environment and the target resource state while executing the resource management command process to determine a state difference;
  determining a resource state remediation operation and sending a notification of the resource state remediation operation in response to a state progression query, wherein the state progression query comprising requests for retrieval of differences between the current resource state and the target resource state and for resource state remediation operations to be applied to the current resource state; and
  remediating resources in the distributed virtualization computing environment based on the state difference to achieve the target resource state.

16. The computer readable medium of claim 15, wherein the resource state remediation operation is determined based at least in part on a state management rule.

17. The computer readable medium of claim 15, the set of acts further comprising deferring remediating the distributed virtualization computing environment until a future time.

18. The computer readable medium of claim 15, the set of acts further comprising invoking a second resource state remediation operation.

19. The computer readable medium of claim 18, further comprising deferring processing of further resource state remediation operations.

20. A system comprising:
  a storage medium having stored thereon a sequence of instructions; and
  a processor that executes the sequence of instructions to perform a set of acts, the set of acts comprising:
    executing a resource management command at the processor to achieve a target resource state in a distributed virtualization computing environment, wherein the process to achieve the target resource state comprises generating the resource management command based at least in part on a specification parameter that describes the target resource state of the distributed virtualization computing environment;

retrieving an indication of differences in a current resource state and the target resource state while executing the resource management command process to determine a state difference;

determining a resource state remediation operation and sending a notification of the resource state remediation operation in response to a state progression query, wherein the state progression query comprising requests for retrieval of differences between the current resource state and the target resource state and for resource state remediation operations to be applied to the current resource state; and remediating the distributed virtualization computing environment based on the state difference.

21. The system of claim 20, wherein the resource state remediation operation is determined based at least in part on a state management rule.

22. The system of claim 20, the set of acts further comprising deferring remediating the distributed virtualization computing environment until a future time.

23. The system of claim 20, the set of acts further comprising invoking a second resource state remediation operation.

24. The system of claim 23, further comprising deferring processing of further resource state remediation operations.

25. The system of claim 20, the set of acts further comprising receiving a state progression query while executing the resource management command process.

* * * * *